(12) United States Patent
Haruta

(10) Patent No.: US 10,748,254 B2
(45) Date of Patent: Aug. 18, 2020

(54) IMAGE PROCESSING APPARATUS, IMAGE PROCESSING METHOD, AND STORAGE MEDIUM TO CHANGE INTENSITY OF EDGE CORRECTION PROCESSING

(71) Applicant: CANON KABUSHIKI KAISHA, Tokyo (JP)

(72) Inventor: Kenichirou Haruta, Nagareyama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/431,392

(22) Filed: Jun. 4, 2019

(65) Prior Publication Data
US 2020/0027197 A1    Jan. 23, 2020

(30) Foreign Application Priority Data

Jul. 19, 2018    (JP) .................................. 2018-136070

(51) Int. Cl.
  *G06T 5/00*    (2006.01)
  *G06F 3/12*    (2006.01)

(52) U.S. Cl.
  CPC ............ *G06T 5/002* (2013.01); *G06F 3/1208* (2013.01); *G06F 3/1248* (2013.01); *G06F 3/1256* (2013.01); *G06T 2207/20192* (2013.01)

(58) Field of Classification Search
  None
  See application file for complete search history.

(56) References Cited

U.S. PATENT DOCUMENTS

| 8,159,694 | B2 * | 4/2012 | Yabe | H04N 1/405 |
| | | | | 345/592 |
| 2009/0274386 | A1 * | 11/2009 | Panetta | G06T 5/005 |
| | | | | 382/266 |
| 2012/0147431 | A1 * | 6/2012 | Kashibuchi | H04N 1/4092 |
| | | | | 358/3.27 |
| 2012/0170061 | A1 * | 7/2012 | Yabe | H04N 1/405 |
| | | | | 358/1.2 |
| 2013/0051664 | A1 * | 2/2013 | Fujita | G06T 5/20 |
| | | | | 382/165 |
| 2016/0072982 | A1 * | 3/2016 | Muraishi | H04N 1/58 |
| | | | | 358/2.1 |
| 2018/0234590 | A1 * | 8/2018 | Haruta | H04N 1/29 |

FOREIGN PATENT DOCUMENTS

| JP | 2006-295877 A | 10/2006 |
| JP | 2016-58879 A | 4/2016 |

* cited by examiner

*Primary Examiner* — Dung D Tran
(74) *Attorney, Agent, or Firm* — Canon U.S.A., Inc. I.P. Division

(57) ABSTRACT

An image processing apparatus includes a comparison unit and a control unit. The comparison unit compares a light-dark pattern of a plurality of pixels of an input image with a previously-stored pattern to determine a semitransparent object. The plurality of pixels include a pixel of interest and peripheral pixels thereof. The control unit changes intensity of edge correction processing to be applied to the pixel of interest in at least three levels based on a result of the comparison by the comparison unit.

7 Claims, 20 Drawing Sheets

TRANSPARENCY 95%

TRANSPARENCY 85%

TRANSPARENCY 75%

TRANSPARENCY 50%

TWICE HORIZONTALLY
AND VERTICALLY
TRANSPARENCY 50%

FOUR TIMES HORIZONTALLY
AND VERTICALLY
TRANSPARENCY 50%

| j\i | 0 | 1 | 2 | 3 | 4 | 5 | 6 |
|---|---|---|---|---|---|---|---|
| 0 | 0 | 1 | 0 | 0 | 1 | 1 | 0 |
| 1 | 0 | 0 | 0 | 0 | 0 | 0 | 0 |
| 2 | 0 | 0 | 0 | 0 | 0 | 0 | 0 |
| 3 | 1 | 0 | 0 | 1 | 1 | 0 | 0 |
| 4 | 1 | 0 | 0 | 1 | 1 | 0 | 0 |
| 5 | 0 | 0 | 0 | 0 | 0 | 0 | 0 |
| 6 | 0 | 0 | 0 | 0 | 0 | 0 | 0 |

FIG.8B

| j\i | 0 | 1 | 2 | 3 | 4 | 5 | 6 |
|---|---|---|---|---|---|---|---|
| 0 | 0 | 0 | 0 | 0 | 0 | 0 | 0 |
| 1 | 0 | 0 | 0 | 0 | 0 | 0 | 0 |
| 2 | 1 | 0 | 0 | 1 | 1 | 0 | 0 |
| 3 | 1 | 0 | 0 | 1 | 1 | 0 | 0 |
| 4 | 0 | 0 | 0 | 0 | 0 | 0 | 0 |
| 5 | 0 | 0 | 0 | 0 | 0 | 0 | 0 |
| 6 | 1 | 0 | 0 | 1 | 1 | 0 | 0 |

FIG.8C

| j\i | 0 | 1 | 2 | 3 | 4 | 5 | 6 |
|---|---|---|---|---|---|---|---|
| 0 | 0 | 0 | 0 | 0 | 0 | 0 | 0 |
| 1 | 0 | 0 | 0 | 0 | 0 | 0 | 0 |
| 2 | 0 | 0 | 0 | 1 | 1 | 0 | 0 |
| 3 | 0 | 1 | 1 | 0 | 0 | 1 | 1 |
| 4 | 0 | 0 | 0 | 1 | 1 | 0 | 0 |
| 5 | 0 | 0 | 0 | 0 | 0 | 0 | 0 |
| 6 | 0 | 0 | 1 | 1 | 0 | 0 | 1 |

FIG.8D

| j\i | 0 | 1 | 2 | 3 | 4 | 5 | 6 |
|---|---|---|---|---|---|---|---|
| 0 | 0 | 0 | 1 | 1 | 0 | 0 | 1 |
| 1 | 0 | 0 | 0 | 0 | 0 | 0 | 0 |
| 2 | 0 | 0 | 0 | 0 | 0 | 0 | 0 |
| 3 | 0 | 0 | 0 | 1 | 0 | 0 | 1 |
| 4 | 0 | 0 | 0 | 1 | 1 | 0 | 1 |
| 5 | 0 | 0 | 0 | 0 | 1 | 0 | 0 |
| 6 | 0 | 0 | 0 | 0 | 0 | 0 | 0 |

FIG.8E

| j\i | 0 | 1 | 2 | 3 | 4 | 5 | 6 |
|---|---|---|---|---|---|---|---|
| 0 | 0 | 0 | 0 | 0 | 0 | 0 | 0 |
| 1 | 0 | 0 | 0 | 0 | 0 | 0 | 0 |
| 2 | 0 | 1 | 0 | 0 | 1 | 1 | 0 |
| 3 | 0 | 1 | 0 | 0 | 1 | 1 | 0 |
| 4 | 0 | 0 | 0 | 0 | 0 | 0 | 0 |
| 5 | 0 | 0 | 0 | 0 | 0 | 0 | 0 |
| 6 | 0 | 1 | 0 | 0 | 1 | 1 | 0 |

FIG.8F

| j\i | 0 | 1 | 2 | 3 | 4 | 5 | 6 |
|---|---|---|---|---|---|---|---|
| 0 | 0 | 0 | 0 | 0 | 0 | 0 | 0 |
| 1 | 0 | 0 | 0 | 0 | 0 | 0 | 0 |
| 2 | 0 | 0 | 1 | 1 | 0 | 0 | 1 |
| 3 | 0 | 0 | 1 | 1 | 0 | 0 | 1 |
| 4 | 0 | 0 | 0 | 0 | 0 | 0 | 0 |
| 5 | 0 | 0 | 0 | 0 | 0 | 0 | 0 |
| 6 | 0 | 0 | 1 | 1 | 0 | 0 | 1 |

FIG.8G

| j\i | 0 | 1 | 2 | 3 | 4 | 5 | 6 |
|---|---|---|---|---|---|---|---|
| 0 | 0 | 0 | 1 | 1 | 0 | 0 | 1 |
| 1 | 0 | 0 | 0 | 0 | 0 | 0 | 0 |
| 2 | 0 | 0 | 0 | 0 | 0 | 0 | 0 |
| 3 | 0 | 0 | 1 | 1 | 0 | 0 | 1 |
| 4 | 0 | 1 | 1 | 0 | 0 | 1 | 1 |
| 5 | 0 | 0 | 0 | 0 | 0 | 0 | 0 |
| 6 | 0 | 0 | 0 | 0 | 0 | 0 | 0 |

FIG.8H

| j\i | 0 | 1 | 2 | 3 | 4 | 5 | 6 |
|---|---|---|---|---|---|---|---|
| 0 | 1 | 0 | 0 | 1 | 1 | 0 | 0 |
| 1 | 1 | 0 | 0 | 1 | 0 | 0 | 0 |
| 2 | 0 | 0 | 0 | 0 | 0 | 0 | 0 |
| 3 | 0 | 0 | 1 | 1 | 0 | 0 | 1 |
| 4 | 1 | 0 | 0 | 1 | 1 | 0 | 0 |
| 5 | 0 | 0 | 0 | 1 | 0 | 0 | 0 |
| 6 | 0 | 0 | 0 | 0 | 0 | 0 | 0 |

FIG.9A

| j\i | 0 | 1 | 2 | 3 | 4 | 5 | 6 |
|---|---|---|---|---|---|---|---|
| 0 | 1 | 0 | 0 | 1 | 1 | 0 | 0 |
| 1 | 0 | 0 | 0 | 0 | 0 | 0 | 0 |
| 2 | 0 | 0 | 0 | 0 | 0 | 0 | 0 |
| 3 | 1 | 0 | 0 | 1 | 1 | 0 | 0 |
| 4 | 1 | 0 | 0 | 1 | 1 | 0 | 0 |
| 5 | 0 | 0 | 0 | 0 | 0 | 0 | 0 |
| 6 | 0 | 0 | 0 | 0 | 0 | 0 | 0 |

FIG.9B

| j\i | 0 | 1 | 2 | 3 | 4 | 5 | 6 |
|---|---|---|---|---|---|---|---|
| 0 | 0 | 0 | 0 | 1 | 1 | 1 | 1 |
| 1 | 0 | 0 | 0 | 1 | 1 | 1 | 1 |
| 2 | 0 | 0 | 0 | 1 | 1 | 1 | 1 |
| 3 | 0 | 0 | 0 | 1 | 1 | 1 | 1 |
| 4 | 0 | 0 | 0 | 1 | 1 | 1 | 1 |
| 5 | 0 | 0 | 0 | 1 | 1 | 1 | 1 |
| 6 | 0 | 0 | 0 | 1 | 1 | 1 | 1 |

FIG.9C

| j\i | 0 | 1 | 2 | 3 | 4 | 5 | 6 |
|---|---|---|---|---|---|---|---|
| 0 | 1 | 1 | 1 | 1 | 1 | 1 | 1 |
| 1 | 1 | 1 | 1 | 1 | 1 | 1 | 1 |
| 2 | 1 | 0 | 0 | 1 | 1 | 0 | 0 |
| 3 | 1 | 0 | 0 | 1 | 1 | 0 | 0 |
| 4 | 0 | 0 | 0 | 1 | 1 | 0 | 0 |
| 5 | 0 | 0 | 0 | 0 | 0 | 0 | 0 |
| 6 | 0 | 0 | 0 | 0 | 0 | 0 | 0 |

| 0 | 0 | 0 | 0 | 0 | 0 | 0 |
|---|---|---|---|---|---|---|
| 2 | 0 | 0 | 0 | 0 | 0 | 0 |
| 2 | 0 | 0 | 0 | 1 | 1 | 0 |
| 0 | 2 | 0 | 0 | 1 | 1 | 0 |
| 0 | 0 | 0 | 0 | 0 | 0 | 0 |
| 0 | 0 | 0 | 0 | 0 | 0 | 0 |
| 2 | 0 | 0 | 2 | 2 | 0 | 0 |

FIG.17B

| 0 | 0 | 2 | 2 | 0 | 0 | 2 | 2 |
|---|---|---|---|---|---|---|---|
| 1 | 0 | 0 | 1 | 1 | 0 | 0 | 2 |
| 0 | 1 | 1 | 0 | 0 | 1 | 1 | 0 |
| 1 | 0 | 0 | 1 | 1 | 0 | 0 | 2 |
| 0 | 2 | 2 | 0 | 0 | 2 | 2 | 0 |
| 1 | 0 | 0 | 1 | 1 | 0 | 0 | 2 |

FIG.17C

| | | | | i | | | |
|---|---|---|---|---|---|---|---|
| | 0 | 1 | 2 | 3 | 4 | 5 | 6 |
| 0 | 0 | 2 | 0 | 0 | 2 | 0 | 0 |
| 1 | 0 | 0 | 0 | 0 | 0 | 0 | 0 |
| 2 | 0 | 0 | 0 | 1 | 1 | 0 | 0 |
| 3 | 0 | 0 | 0 | 1 | 1 | 0 | 0 |
| 4 | 0 | 0 | 0 | 0 | 0 | 0 | 0 |
| 5 | 0 | 0 | 0 | 0 | 0 | 0 | 0 |
| 6 | 0 | 2 | 0 | 0 | 2 | 0 | 0 | j

FIG.17D

| | | | | i | | | |
|---|---|---|---|---|---|---|---|
| | 0 | 1 | 2 | 3 | 4 | 5 | 6 |
| 0 | 0 | 0 | 0 | 0 | 0 | 0 | 0 |
| 1 | 0 | 0 | 0 | 0 | 0 | 0 | 0 |
| 2 | 0 | 2 | 0 | 0 | 1 | 0 | 0 |
| 3 | 0 | 2 | 0 | 0 | 1 | 0 | 0 |
| 4 | 0 | 0 | 0 | 0 | 0 | 0 | 0 |
| 5 | 0 | 0 | 0 | 0 | 0 | 0 | 0 |
| 6 | 0 | 2 | 0 | 0 | 2 | 0 | 0 | j

FIG.17E

| | | | | i | | | |
|---|---|---|---|---|---|---|---|
| | 0 | 1 | 2 | 3 | 4 | 5 | 6 |
| 0 | 0 | 0 | 0 | 0 | 0 | 0 | 0 |
| 1 | 0 | 0 | 0 | 0 | 0 | 0 | 0 |
| 2 | 0 | 0 | 1 | 1 | 0 | 0 | 2 |
| 3 | 0 | 0 | 1 | 1 | 0 | 0 | 2 |
| 4 | 0 | 0 | 0 | 0 | 0 | 0 | 0 |
| 5 | 0 | 0 | 0 | 0 | 0 | 0 | 0 |
| 6 | 0 | 0 | 2 | 2 | 0 | 0 | 2 | j

FIG.17F

| | | | | i | | | |
|---|---|---|---|---|---|---|---|
| | 0 | 1 | 2 | 3 | 4 | 5 | 6 |
| 0 | 0 | 0 | 2 | 2 | 0 | 0 | 2 |
| 1 | 0 | 0 | 0 | 0 | 0 | 0 | 0 |
| 2 | 0 | 0 | 0 | 0 | 0 | 0 | 0 |
| 3 | 0 | 0 | 1 | 1 | 0 | 0 | 2 |
| 4 | 0 | 0 | 1 | 1 | 0 | 0 | 2 |
| 5 | 0 | 0 | 0 | 0 | 0 | 0 | 0 |
| 6 | 0 | 0 | 0 | 0 | 0 | 0 | 0 | j

FIG.17G

| | | | | i | | | |
|---|---|---|---|---|---|---|---|
| | 0 | 1 | 2 | 3 | 4 | 5 | 6 |
| 0 | 0 | 1 | 0 | 0 | 1 | 0 | 0 |
| 1 | 0 | 2 | 2 | 0 | 0 | 2 | 2 |
| 2 | 0 | 2 | 2 | 0 | 0 | 2 | 2 |
| 3 | 0 | 1 | 0 | 0 | 1 | 0 | 0 |
| 4 | 0 | 2 | 2 | 0 | 0 | 2 | 2 |
| 5 | 0 | 2 | 2 | 0 | 0 | 2 | 2 |
| 6 | 0 | 1 | 0 | 0 | 1 | 0 | 0 | j

FIG.17H

| | | | | i | | | |
|---|---|---|---|---|---|---|---|
| | 0 | 1 | 2 | 3 | 4 | 5 | 6 |
| 0 | 0 | 2 | 2 | 2 | 0 | 2 | 2 |
| 1 | 0 | 2 | 2 | 0 | 0 | 2 | 2 |
| 2 | 0 | 2 | 2 | 0 | 0 | 2 | 2 |
| 3 | 1 | 0 | 0 | 1 | 1 | 0 | 0 |
| 4 | 0 | 2 | 2 | 0 | 0 | 2 | 2 |
| 5 | 0 | 2 | 2 | 0 | 0 | 2 | 2 |
| 6 | 0 | 1 | 0 | 0 | 1 | 0 | 0 | j

FIG.17I

| | | | | i | | | |
|---|---|---|---|---|---|---|---|
| | 0 | 1 | 2 | 3 | 4 | 5 | 6 |
| 0 | 2 | 2 | 0 | 0 | 2 | 2 | 0 |
| 1 | 2 | 2 | 0 | 0 | 2 | 2 | 0 |
| 2 | 0 | 0 | 1 | 1 | 0 | 0 | 1 |
| 3 | 0 | 0 | 2 | 1 | 0 | 0 | 1 |
| 4 | 2 | 2 | 0 | 0 | 2 | 2 | 0 |
| 5 | 2 | 2 | 0 | 0 | 2 | 2 | 0 |
| 6 | 0 | 0 | 1 | 1 | 0 | 0 | 1 | j

FIG.17J

| | | | | i | | | |
|---|---|---|---|---|---|---|---|
| | 0 | 1 | 2 | 3 | 4 | 5 | 6 |
| 0 | 0 | 2 | 2 | 0 | 0 | 2 | 2 |
| 1 | 0 | 2 | 2 | 0 | 0 | 2 | 2 |
| 2 | 2 | 0 | 0 | 2 | 2 | 0 | 0 |
| 3 | 0 | 0 | 1 | 1 | 0 | 0 | 1 |
| 4 | 0 | 0 | 1 | 1 | 0 | 0 | 1 |
| 5 | 2 | 2 | 0 | 0 | 2 | 2 | 0 |
| 6 | 0 | 2 | 2 | 0 | 0 | 2 | 2 | j

IMAGE PROCESSING APPARATUS, IMAGE PROCESSING METHOD, AND STORAGE MEDIUM TO CHANGE INTENSITY OF EDGE CORRECTION PROCESSING

BACKGROUND OF THE INVENTION

Field of the Invention

The present disclosure relates to an image processing apparatus, an image processing method, and a program for performing edge correction processing on an image.

Description of the Related Art

Techniques for improving jaggedness, called jaggies, occurring at character edges in an image processing apparatus have been known heretofore. Japanese Patent Application Laid-Open No. 2006-295877 discusses an edge correction technique for determining pixels having a signal value contrast higher than or equal to a predetermined threshold as edge pixels by using multivalued image data before screen processing, and combining screen-processed image data with correction data on the edge pixels.

Windows (registered trademark) has been known as a personal computer operating system (OS). Architectures such as Windows use a technique called raster operation (ROP) to express transparent objects in a simple manner. ROP can express a transparent image through pixel-by-pixel logical operations between an underlying image and an image superposed thereon.

To ensure compatibility with Windows, image forming apparatuses such as a printer can use a ROP-supporting page description language (PDL). In such a case, a semitransparent object expressed by ROP is generated by logically combining a halftone mask image rendered in halftone dots based on transparency and the underlying background image.

The foregoing semitransparent object expressed by ROP is a halftone image of certain density level or more on a white background image, with a contrast in signal value.

In edge detection processing of the image forming apparatus, the area expressed in halftones to implement semi-transparency is determined to include edge pixels. In such a case, the edge correction processing for improving jaggies is applied even to the area that is supposed to express the semitransparent object, and the resulting image has color values different from the original (darker colors than intended by the user) due to antialiasing processing.

Japanese Patent Application Laid-Open No. 2016-58879 discusses a technique for suppressing the application of the edge correction processing to the semitransparent object. Japanese Patent Application Laid-Open No. 2016-58879 discusses a method for improving jaggies in an entire image while maintaining the color values of a semitransparent object. Japanese Patent Application Laid-Open No. 2016-58879 focuses on the fact that an ordinary image is less likely to include concentrations of edge pixels while a semitransparent object expressed by ROP includes a dense concentration of edge pixels. Japanese Patent Application Laid-Open No. 2016-58879 discusses a mechanism for determining whether a pixel is one constituting a semitransparent object expressed by ROP, and if the pixel is determined to be one constituting a semitransparent object expressed by ROP, performing control to not apply the edge correction processing to the pixel of interest.

In a method discussed in Japanese Patent Application Laid-Open No. 2016-58879, a pixel of interest is determined to be a pixel constituting a semitransparent object if a determination pattern and an image area including the pixel of interest are found to match by pattern matching.

According to the method discussed in Japanese Patent Application Laid-Open No. 2016-58879, a regular semi-transparent pattern can be disturbed and unable to be identified as that of a semitransparent object if an object such as a character is superposed on the semitransparent object. In other words, according to the conventional method, pixels in the area of a semitransparent object where another object such as a character and a line overlaps may be unable to be identified as ones constituting the semitransparent object, and the edge correction processing can be applied to the borders and inside of the overlapping area. This gives rise to an issue of collapsed characters with a drop in character legibility.

SUMMARY OF THE INVENTION

According to an aspect of the present disclosure, an image processing apparatus includes a comparison unit configured to compare a light-dark pattern of a plurality of pixels of an input image with a previously-stored pattern to determine a semitransparent object, wherein the plurality of pixels include a pixel of interest and peripheral pixels thereof, and a control unit configured to change intensity of edge correction processing to be applied to the pixel of interest in at least three levels based on a result of the comparison by the comparison unit.

Further features of the present disclosure will become apparent from the following description of embodiments with reference to the attached drawings.

BRIEF DESCRIPTION OF THE DRAWINGS

FIGS. 7A to 7H are schematic diagrams illustrating examples of determination patterns.

FIGS. 8A to 8H are schematic diagrams illustrating processing for rotating and/or reversing a determination pattern.

FIGS. 9A to 9C are diagrams illustrating examples of a binarized output image,

FIGS. 17A to 17J are diagrams illustrating examples of determination patterns according to a second embodiment.

DESCRIPTION OF THE EMBODIMENTS

Embodiments for carrying out the present disclosure will be described below with reference to the drawings. The following embodiments are not intended to limit the disclosures set forth in the claims. All combinations of features described in the embodiments are not necessarily indispensable to the disclosure.

In a first embodiment, a method for edge correction processing will be described by using an image processing apparatus performing edge correction processing as an example. In particular, a mode for deriving a degree of similarity indicating a degree of semitransparency of each pixel in an input image and performing edge correction processing based on the degree of semitransparency will be described.

<Apparatus Configuration>

Figure 1:
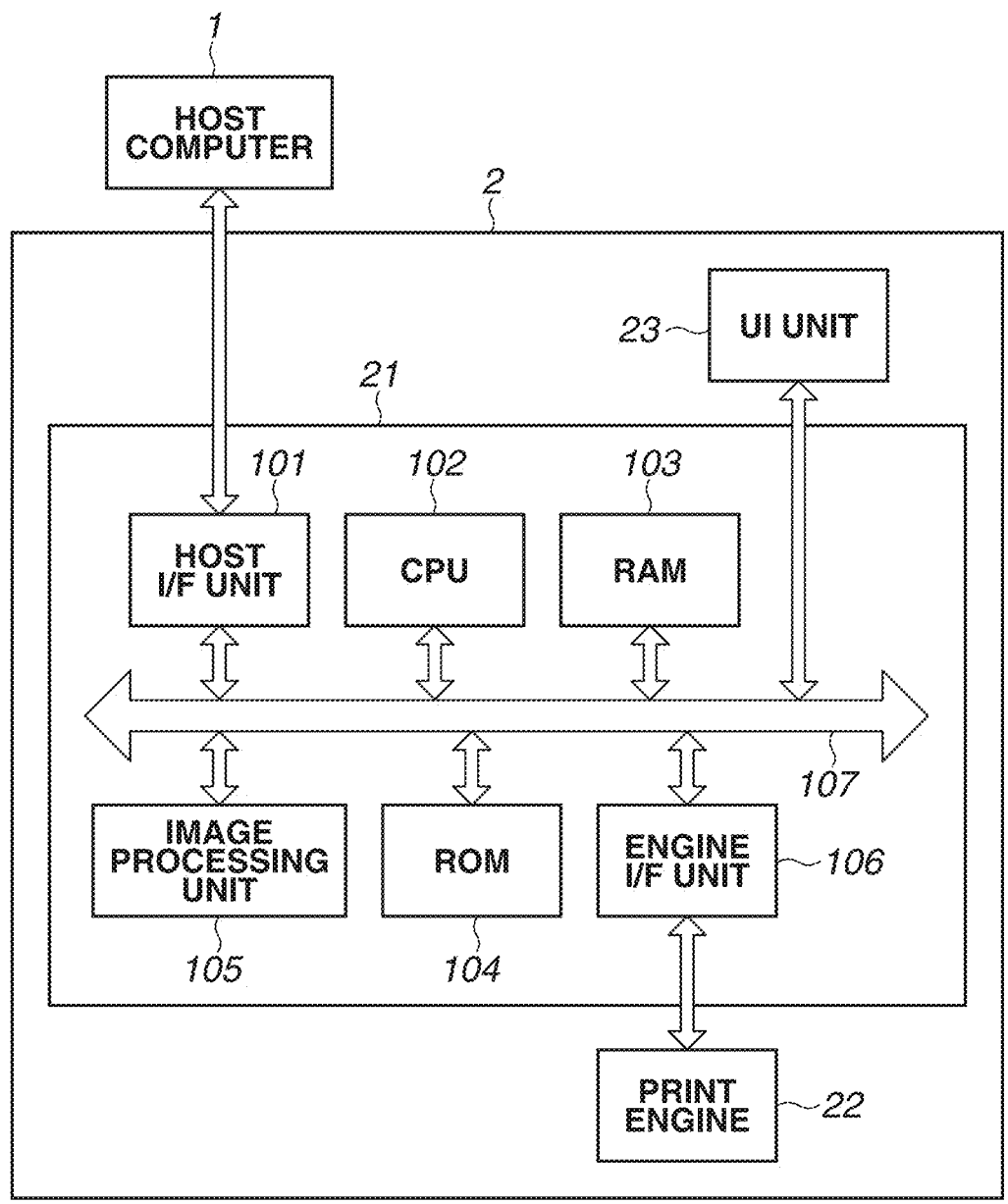
FIG. 1 is a diagram illustrating an example of a printing system.

FIG. 1 is a schematic diagram illustrating a system configuration according to the present embodiment. FIG. 1 illustrates an image processing system including a host computer 1 and an image forming apparatus 2. The host computer 1 is a computer such as an ordinary personal computer (PC). Images and documents generated by a software application such as a not-illustrated printer driver on the host computer 1 are transmitted as page description language (PDL) data to the image forming apparatus 2 via a network. The image forming apparatus 2 has a function of receiving a print job including PDL data from the host computer 1 and printing an image on a sheet based on the print job.

In the present embodiment, the image forming apparatus 2 having the print function is described as an example of the information processing apparatus. However, this is not restrictive. The image processing apparatus may be a print server that generates an image to be printed.

A hardware configuration of the image forming apparatus 2 will be described. The image forming apparatus 2 includes a controller 21, a print engine 22, and a user interface (UI) unit 23.

The controller 21 is connected to the print engine 22. The controller 21 receives PDL data from the host computer 1, converts PDL data into print data processable by the print engine 22, and outputs the print data to the print engine 22.

The print engine 22 prints an image on a sheet based on the print data output from the controller 21. The image-printed sheet is discharged to a not-illustrated sheet discharge unit. In the present embodiment, the print engine 22 is described to be an electrophotographic print engine. However, this is not restrictive. For example, the print engine 22 may be an inkjet print engine.

The UI unit 23 is operated by a user, and used to select various functions and make operation instructions. More specifically, the UI unit 23 functions as an acceptance unit for accepting user operations and a display unit for presenting information to the user. The UI unit 23 includes a liquid crystal display having a touch panel installed on its surface, and a keyboard on which various keys including a start key, a stop key, and a numerical key pad are arranged.

Next, details of the controller 21 will be described. The controller 21 includes a host interface (I/F) unit 101, a central processing unit (CPU) 102, and a random access memory (RAM) 103. The controller 21 also includes a read-only memory (ROM) 104, an image processing unit 105, an engine OF unit 106, and an internal bus 107. The host I/F unit 101 is an interface for receiving PDL data transmitted from the host computer 1.

The CPU 102 controls the entire image forming apparatus 2 by using programs and data stored in the RAM 103 and the ROM 104, and executes processing to be described below for the controller 21 to perform. The RAM 103 includes a work area to be used when the CPU 102 executes various types of processing. The ROM 104 stores programs and data for causing the CPU 102 to execute various types of processing to be described below, and setting data of the controller 21.

The image processing unit 105 performs print image processing on the PIN, data received by the host I/F unit 101 and generates print data processable by the print engine 22 based on settings made by the CPU 102. In particular, the image processing unit 105 rasterizes the received PDL data to generate image data having a plurality of color components for each pixel. The plurality of color components refers to independent color components in a color space such as a red-green-blue (RGB) color space. The image data has an 8-bit (256-level) value for each color component pixel by pixel. In other words, the image data is multivalued bitmap data including multivalued pixels. Using the generated image data, the image processing unit 105 generates print data by applying image processing such as color conversion front the RGB color space into a cyan-magenta-yellow-black (CMYK) color space and screen processing. The image processing unit 105 also performs edge correction processing. Details of the image processing unit 105 will be described below.

The engine I/F unit 106 is an for transmitting the print data generated by the image processing unit 105 to the print engine 22. The internal bus 107 is a system bus for transmitting and receiving data and control commands to/from the foregoing components.

<Image Processing Unit>

Figure 2:
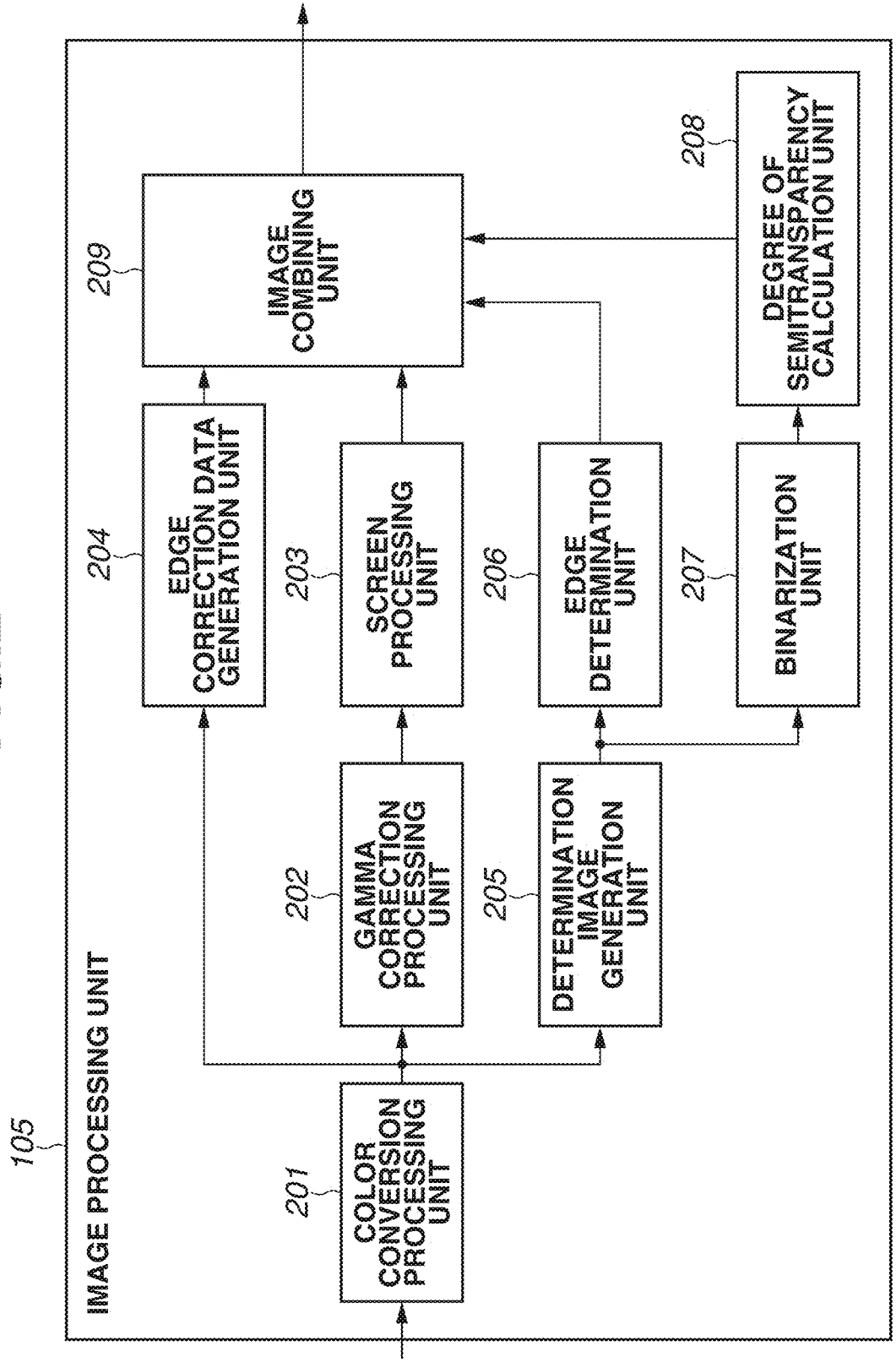
FIG. 2 is a diagram illustrating an example of a hardware module configuration of an image processing unit.

Next, details of the image processing unit 105 will be described. As described above, the image processing unit 105 generates RGB multivalued image data by performing rasterization processing on the PDL data received by the host I/F unit 101. FIG. 2 is a diagram illustrating the print image processing performed on the generated multivalued image data in the image processing unit 105. As illustrated in FIG. 2, the image processing unit 105 includes a color conversion processing unit 201 and a gamma correction processing unit 202. The image processing unit 105 also includes a screen processing unit 203, an edge correction data generation unit 204, a determination image generation unit 205, an edge determination unit 206, a binarization unit 207, a degree of semitransparency calculation unit 208, and an image combining unit 209.

The color conversion processing unit 201 performs color conversion processing from the RGB color space into the CMYK color space on the multivalued image data. The color conversion processing generates CMYK image data including 8-bit (256-level) multivalued density values (also referred to as gradation values or signal values) for each pixel. The CMYK image data is stored in a not-illustrated buffer in the color conversion processing unit 201.

The gamma correction processing unit 202 corrects input pixel data by using a one-dimensional lookup table so that image data screen-processed by the screen processing unit 203 to be described below has a desired or predetermined density characteristic when transferred to a recording sheet. In the present embodiment, a one-dimensional lookup table of linear configuration is used as an example. The lookup table is one such that an input is output as is. The CPU 102 may rewrite the one-dimensional lookup table based on a change in the state of the print engine 22. The gamma-corrected pixel data is input to the screen processing unit 203.

The screen processing unit 203 converts the multivalued (for example, 8-bit) CMYK image received from the gamma correction processing unit 202 into multivalued (for example, 4-bit) CMYK images that are latent images for the color materials of the print engine 22. The screen processing unit 203 outputs the converted CMYK images to the image combining unit 209.

Figure 3:
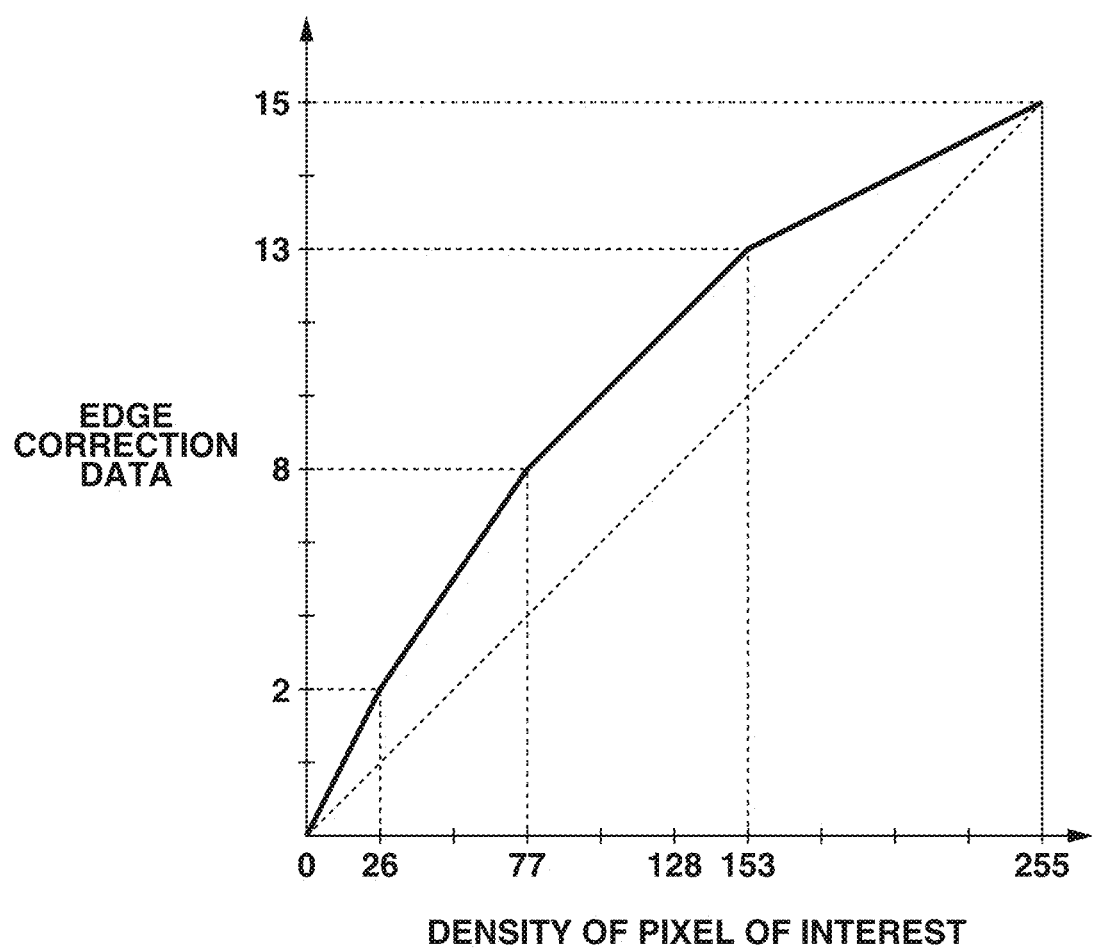
FIG. 3 is a chart illustrating an example of a lookup table used in edge correction processing.

The edge correction data generation unit 204 receives the CMYK image from the color conversion processing unit 201, and generates edge correction data on edge pixels by using a one-dimensional lookup table. The edge correction data generation unit 204 then outputs the generated edge correction data to the image combining unit 209. In the present embodiment, the edge correction data generation unit 204 generates the edge correction data by using a one-dimensional lookup table illustrated in FIG. 3, for example. If a pixel input to the edge correction data generation unit 204 has a signal value of 153, the edge correction data is 13.

The determination image generation unit 205 receives the CMYK image from the color conversion processing unit 201, and generates a determination image intended for determination processing performed by the edge determination unit 206 and the degree of semitransparency calculation unit 208. In the present embodiment, for example, the determination image generation unit 205 generates a determination image by assigning predetermined weights to the respective colors. Specifically, the determination image generation unit 205 generates a determination image by using the following equation:

$$L=(C \times Wc)+(M \times Wm)+(Y \times Wy)+(K \times Wk). \qquad \text{Eq. (1)}$$

In the present embodiment, for example, Wc=0.3, Wm=0.6, Wy=0.1, and Wk=1.0. The values of the weighting factors are not limited thereto. Luminance may be converted into signals. It will be understood that the determination image may be generated from the maximum values of the respective colors or the average values of CMYK, instead of the weighted values.

The edge determination unit 206 receives the determination image from the determination image generation unit 205, and determines edge pixels from the determination image. The edge determination unit 206 outputs "1" for a pixel determined to be an edge pixel, and "0" for a pixel determined not to be an edge pixel. The edge determination unit 206 outputs the resulting edge determination image to the image combining unit 209. Details of the processing of the edge determination unit 206 will be described below with reference to FIG. 4. In short, the edge determination unit 206 determines whether a pixel of interest is an edge-forming pixel.

The binarization unit 207 receives the determination image from the determination image generation unit 205, and generates a binary image from the determination image. The binarization unit 207 compares the determination image with a predetermined threshold (in the present embodiment, 63), outputs "1" if the determination image exceeds the threshold, and outputs "0" in other cases. The binarization unit 207 outputs the binarized image (binary image) to the degree of semitransparency calculation unit 208.

The degree of semitransparency calculation unit 208 receives the binary image from the binarization unit 207, and calculates a degree of similarity indicating a degree of matching between the binary image and determination patterns. The degree of semitransparency calculation unit 208 outputs a calculated degree of semitransparency to the image combining unit 209. Details of the processing of the degree of semitransparency calculation unit 208 will be described below with reference to FIG. 5.

The image combining unit 209 performs image combining processing based on the edge determination image received from the edge determination unit 206 and the degree of semitransparency received from the degree of semitransparency calculation unit 208. The image combining unit 209 performs the image combining processing on the edge correction image received from the edge correction data generation unit 204 and screen images (also referred to as halftone images) received from the screen processing unit 203 based on the edge determination image and the degree of semitransparency. Details of the image combining processing performed by the image combining unit 209 will be described below. The image combining unit 209 then outputs the resulting images of the image combining processing to the engine I/F unit 106.

<Operation of Edge Determination Unit 206>

As described above, the edge determination unit 206 determines edge pixels with the determination image received from the determination image generation unit 205 as an input image. The edge determination unit 206 sets edge information about the determined edge pixels to "1" (edge). The edge determination unit 206 leaves edge information about pixels not determined to be edge pixels as "0" (no edge).

Figure 4:
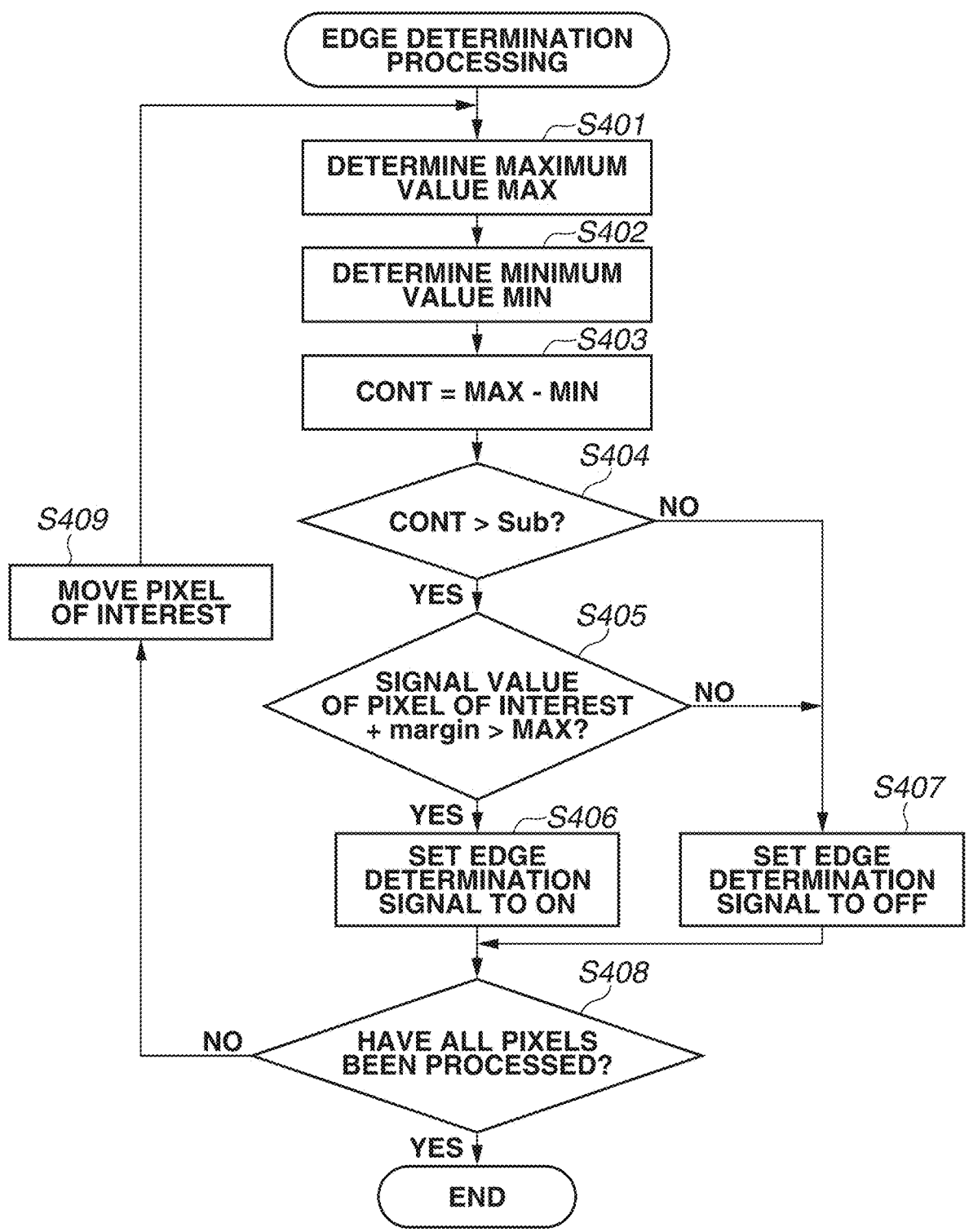
FIG. 4 is a flowchart illustrating an example of edge determination processing.

FIG. 4 is a flowchart of the edge determination processing performed by the edge determination unit 206.

The edge determination unit 206 calculates contrast (difference in density level) between a total of nine pixels (reference region) including a pixel of interest and eight peripheral pixels around the pixel of interest, and makes an edge determination based on whether the contrast is higher than a predetermined threshold.

In step S401, the edge determination unit 206 determines a maximum pixel value (maximum value [MAX]) among the pixel values in the reference region. In step S402, the edge determination unit 206 determines a minimum pixel value (minimum value [MIN]) among the pixel values in the reference region. In step S403, the edge determination unit 206 subtracts the minimum value [MIN] determined in step S402 from the maximum value [MAX] determined in step S401 to determine a contrast value [CONT]. A level difference amount between the signal values of the reference region is thereby calculated.

In step S404, the edge determination unit 206 compares the contrast value [CONT] determined in step S403 with a predetermined edge determination value [Sub], and determines whether the contrast value [CONT] is greater. If, as a result of the determination, the contrast value [CONT] is greater than the edge determination value [Sub] (YES in step S404), the processing proceeds to step S405.

On the other hand, if the contrast value [CONT] is not greater than the edge determination value [Sub] (NO in step S404), the processing proceeds to step S407. In the ease where the contrast value [CONT] is not greater than the edge determination value [Sub], the edge determination unit 206 determines that the edge correction processing is not needed. In step S405, the edge determination unit 206 compares the sum of the signal value of the pixel of interest and a predetermined value [margin] with the maximum value [MAX], and determines whether the sum of the signal value of the pixel of interest and the predetermined value [margin] is greater. If, as a result of the determination, the sum of the signal value of the pixel of interest and the predetermined value [margin] is greater than the maximum value [MAX] (YES in step S405), the processing proceeds to step S406. On the other hand, if the sum of the signal value of the pixel of interest and the predetermined value [margin] not greater than the maximum value [MAX] (NO in step S405), the processing proceeds to step S407.

In step S406, the edge determination unit 206 sets an edge determination signal to "1" (ON). In step S407, the edge determination unit 206 sets the edge determination signal to "0" (OFF). In step S408, the edge determination unit 206 determines whether all the pixels have been processed. If all the pixels have not been processed (NO in step S408), the processing proceeds to step S409. If all the pixels have been processed (YES in step S408), the present processing ends. In step S409, the edge determination unit 206 moves the pixel of interest to the next pixel. The processing of steps S401 to S408 is then performed again.

In the present embodiment, the edge determination unit 206 is described, as an example, to determine that the pixel of interest is an edge based on the maximum and minimum values of the nine neighboring pixels with the pixel of interest at the center. However, this is not restrictive. Edge-forming pixels can be detected based on other edge determination algorithms. Neural networks can be used to detect edge pixels.

<Operation of Degree of Semitransparency Calculation Unit 208>

The degree of semitransparency calculation unit 208 determines a region where an image having a semitransparent pattern exists. The degree of semitransparency calculation unit 208 sets a window of predetermined size for a binary image, and calculates a degree of similarity indicating a degree of matching between the pixels in the window and predetermined determination patterns. In the present embodiment, the degree of semitransparency calculation unit 208 sets a window of 7×7 pixels that are a plurality of pixels including a pixel of interest at the center and peripheral pixels adjacent to the pixel of interest.

When printing document data including a semitransparent object, the host computer 1 generates, as a drawing command, PDL data for generating a pixel-decimated image of a normal object. Based on the semitransparent object drawing command included in the PDL data, the CPU 102 performs rendering processing to generate a pixel-decimated semitransparent pattern image. A semitransparent pattern image is an image in which the pixels of an object having normal color values are decimated in a pattern based on transparency. In the present embodiment, the rendering processing is described to be performed by the image forming apparatus 2. However, this is not restrictive. The host computer 1 may generate a raster image including a semitransparent pattern image, and a print job including the raster image may be received and used for printing.

FIGS. 6A to 6F are diagrams illustrating examples of patterns constituting a semitransparent pattern image. For example, the CPU 102 is configured to draw a semitransparent pattern image in a resolution of 300 dpi. FIGS. 6A to 6D illustrate a semitransparent pattern image when transparencies of 95%, 85%, 75%, and 50% are specified, respectively. Semitransparent patterns thus have different pattern configurations depending on transparency. There are prepared patterns for respective transparencies except transparencies of 0% and 100%. The CPU 102 generates a semitransparent pattern image by repeatedly arranging 16×16 matrix patterns such as illustrated in FIGS. 6A to 6F. Such semitransparent pattern images are set so that the matrix patterns express different phases depending on drawing positions and the number of objects to be drawn. For example, the CPU 102 repeatedly draws the patterns illustrated in FIGS. 6A to 6D in a staggered manner by M pixels (M: up to 15 pixels) to the right and N pixels (N: up to 15 pixels) below.

If an object such as a character is superposed on a generated semitransparent image, a regular semitransparent pattern can be disturbed and unable to be identified as the pattern of a semitransparent object by a conventional method. More specifically, according to the conventional method, if an object such as a character and a line overlaps the area of a semitransparent object, the pixels in the overlapping area are unable to be identified as ones constituting the semitransparent object. The edge correction processing is then applied to the borders and inside of the overlapping area. This gives rise to an issue of collapsed characters with a drop in character legibility.

The present embodiment provides a mechanism for performing edge correction processing based on the degree of similarity so that the edge correction processing can be appropriately performed even on an image including an area where a character overlaps a semitransparent object. A specific mechanism will be described below.

<Description of Determination Patterns>

In the present embodiment, the degree of semitransparency is described to be calculated by using teaching patterns of 7×7 pixels. It will be understood that the size of the teaching patterns is not limited to 7×7 pixels and may be 16×16 pixels. In the present embodiment, the degree of semitransparency is calculated in a resolution of 600 dpi. It will be understood, however, that the resolution may be 300 dpi or 1200 dpi.

In the present embodiment, the 300-dpi 16×16-pixel patterns illustrated in FIGS. 6A to 6F are enlarged to 600 dpi. The resulting 32×32-pixel patterns are input to the degree of semitransparency calculation unit 208.

Semitransparent patterns for transparencies of 99% to 50% are developed so that isolated points are maintained isolated. In semitransparent patterns for transparencies of 49% to 1%, the states of the isolated points are inverted. In view of such a characteristic, the degree of semitransparency is calculated by using determination patterns illustrated in FIGS. 7A to 7H.

FIGS. 7A to 7H are diagrams illustrating examples of teaching patterns serving as teaching data for determination making. The pieces of teaching data will also be referred to as determination patterns. A value "0" in FIGS. 7A to 7H is used to determine whether a corresponding pixel of the output image (binary image) of the binarization unit 207 is "0". A value "1" in FIGS. 7A to 7H is used to determine whether a corresponding pixel of the output image (binary image) of the binarization unit 207 is "1".

Figure 7A:
Figure 7B:
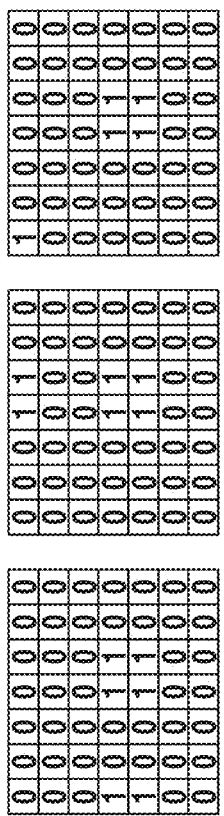
Figure 7C:
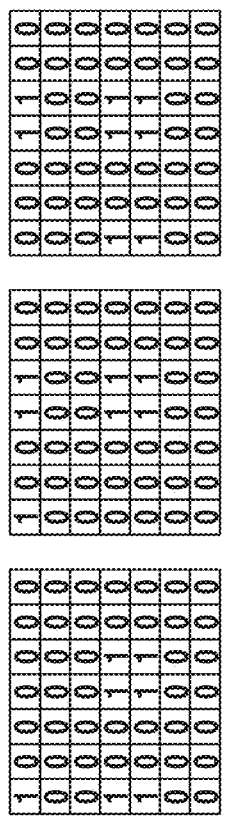
Figure 7D:
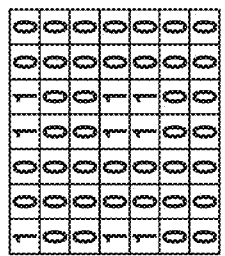
Figures 7E, 7F, 7G, 7H:
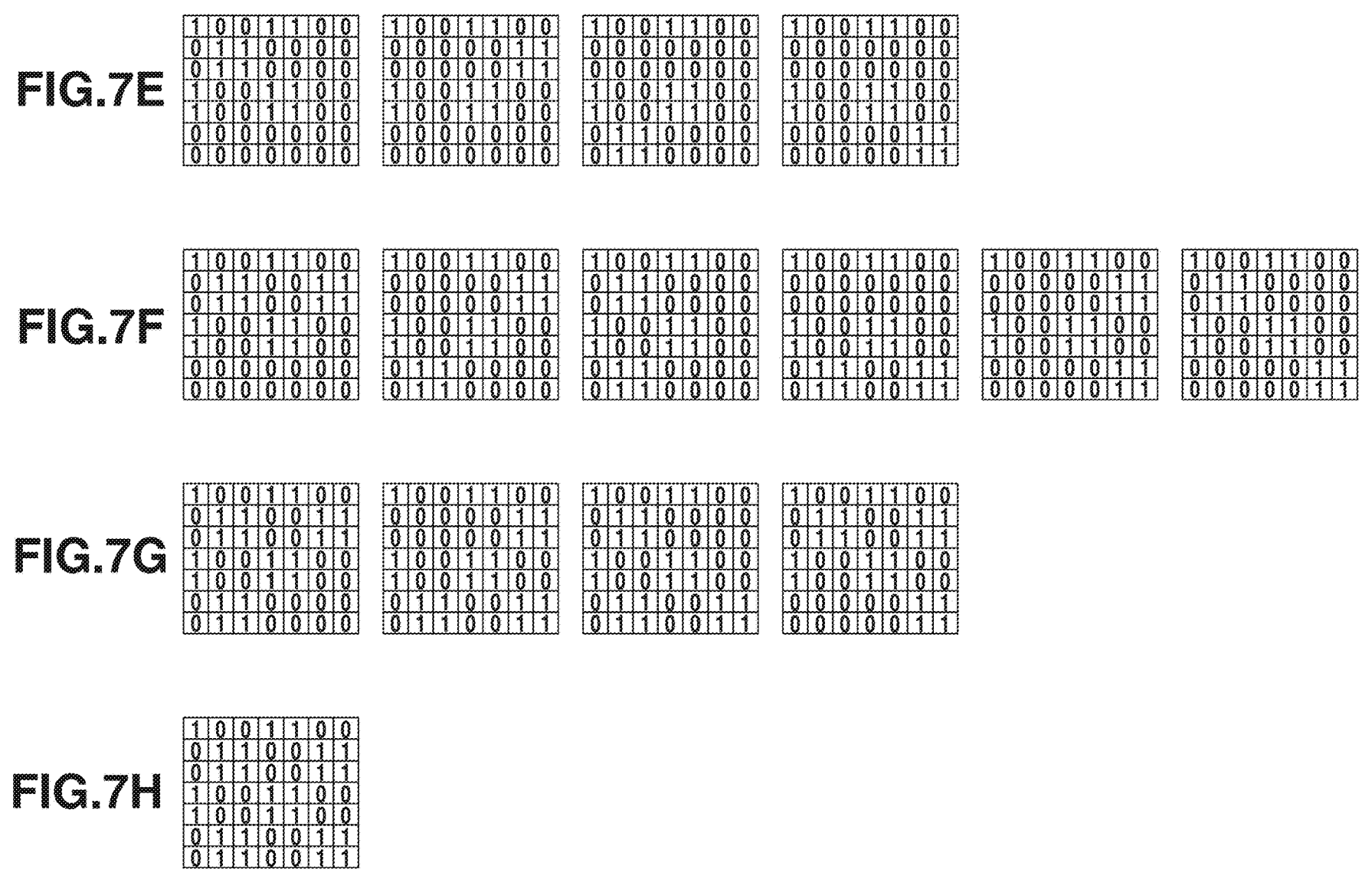

FIG. 7A illustrates a determination pattern for a case where there is a dot (pixel group including vertically or horizontally adjoining pixels having a pixel value of "1") in the 7×7-pixel region. FIG. 7B illustrates determination patterns for a case where there are two dots in the 7×7-pixel region. FIG. 7C illustrates determination patterns for a case where there are three dots in the 7×7-pixel region. FIG. 7D illustrates a determination pattern for a case where there are four dots in the 7×7-pixel region. FIG. 7E illustrates determination patterns for a case where there are five dots in the 7×7-pixel region. FIG. 7F illustrates determination patterns fir a case where there are six dots in the 7×7-pixel region. FIG. 7G illustrates determination patterns for a case where there are seven dots in the 7×7-pixel region. FIG. 7H illustrates a determination pattern for determining a transparency of 50%, i.e., a determination pattern for a case where there are eight dots in the 7×7-pixel region. The determination patterns of FIGS. 7A to 7H are just examples. The determination patterns may be changed as appropriate based on semitransparent pattern images generated by the CPU 102 and the resolution in which the CPU 102 generates the semitransparent pattern images.

<Processing for Deriving Degree of Similarity>

Next, processing for deriving the degree of similarity will be described with reference to FIGS. 5, 8A to 8H, and 9A to 9C. Suppose that a variable [tmp] indicates the degree of matching (degree of similarity) between a predetermined determination pattern [pat] and a binary image [bi]. Variables [i] and [j] indicate a pixel position in the binary image [bi] and the determination pattern [pat]. A variable [k] indicates an image obtained by rotating and/or reversing the determination pattern [pat].

FIGS. 8A to 8H illustrate images obtained by rotating and/or reversing the determination pattern of FIG. 7D. FIG. 8A is the same as FIG. 7D, where the variable [k]=0. FIG. 8B is FIG. 7D rotated 90° to the right, where the variable [k]=1. FIG. 8C is FIG. 7D rotated 180° to the right, where the variable [k]=L. FIG. 8D is FIG. 7D rotated 270° to the right, where the variable [k]=3. FIG. 8E is FIG. 7D horizontally reversed, where the variable [k]=4. FIG. 8F is FIG. 8E rotated 90° to the right, where the variable [k]=5. FIG. 8G is FIG. 8E rotated 180° to the right, where the variable [k]=6. FIG. 8H is FIG. 8E rotated 270° to the right, where the variable [k]=7.

A variable [p] indicates the determination patterns [pat] of FIGS. 7A to 7H. In the present embodiment, there are 23 types of determination patterns [pat]. FIG. 7A corresponds to p=0. FIG. 7B corresponds to p=1 to 3. FIG. 7H corresponds to p=22, A variable [n] represents the presence or absence of logical inversion in the determination patterns [pat] of FIGS. 7A to 7H. If the variable [n]=0, there is no logical inversion. If the variable [n]=1, there is a logical inversion. A degree of similarity [SCORE] indicates the final degree of matching between the binary image [bi] and the determination patterns [pat]. The degree of similarity [SCORE] is the highest of the degrees of matching with all the determination patterns [pat].

FIGS. 9A to 9C illustrate examples of binary images. FIG. 9A illustrates an example of a binary image simulating a semitransparent image. FIG. 9B illustrates an example of a binary image simulating a character or a line. FIG. 9C illustrates an example of an image that is a semitransparent image in part.

Figure 5:
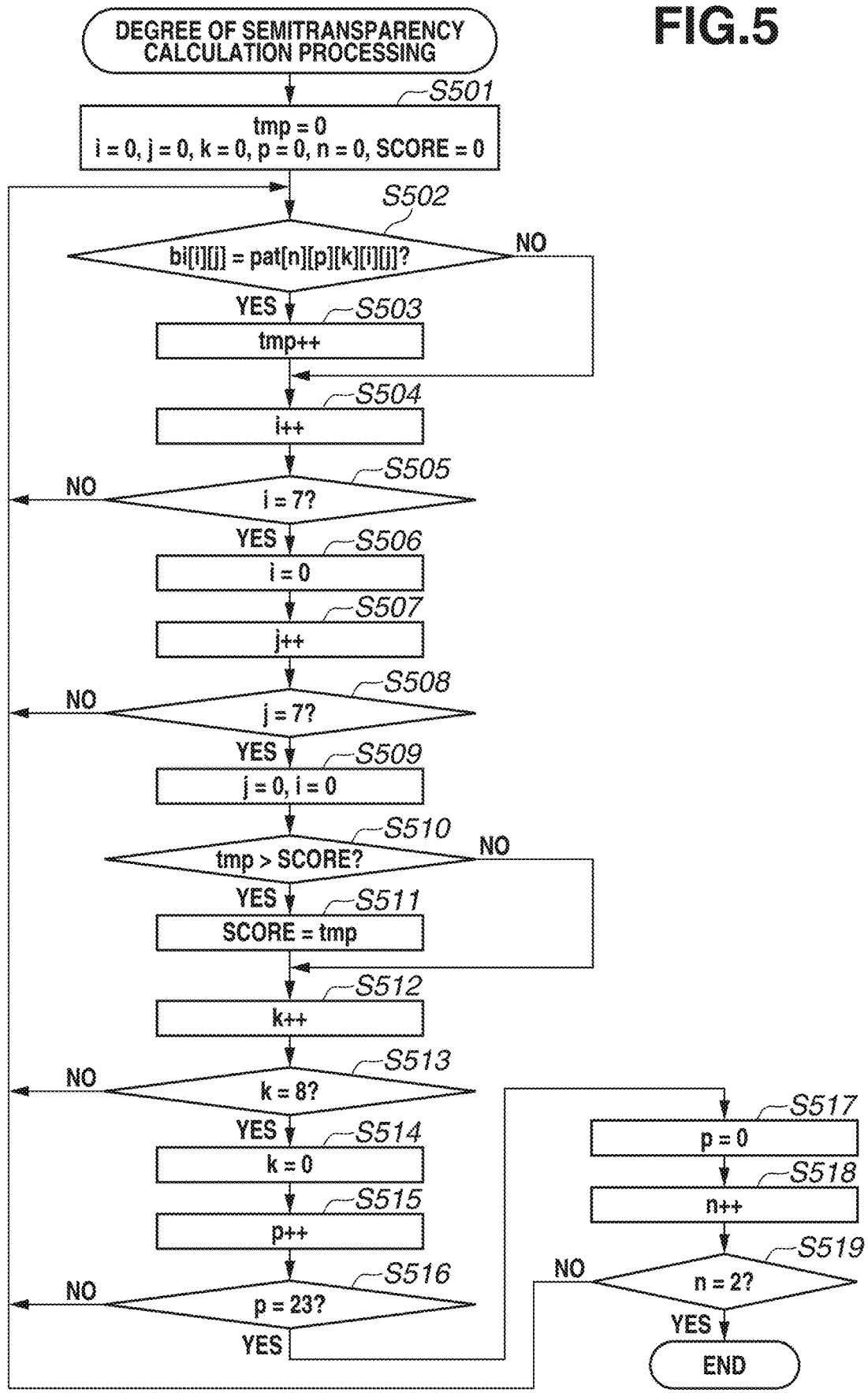
FIG. 5 is a flowchart illustrating an example of a method for deriving a degree of similarity.
Figure 6A:
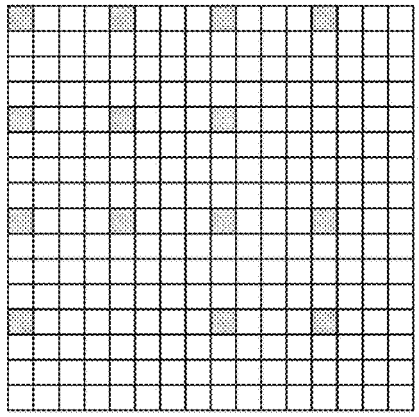
FIGS. 6A to 6F are schematic diagrams illustrating semi-transparent patterns using a raster operation (ROP).
Figure 6B:
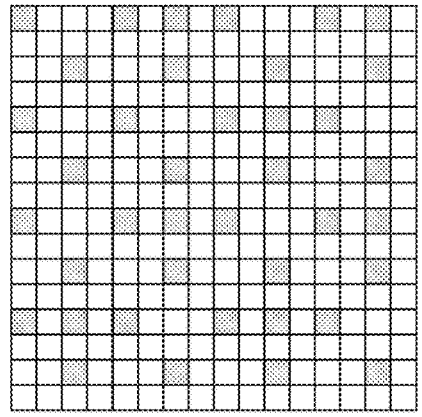
Figure 6C:
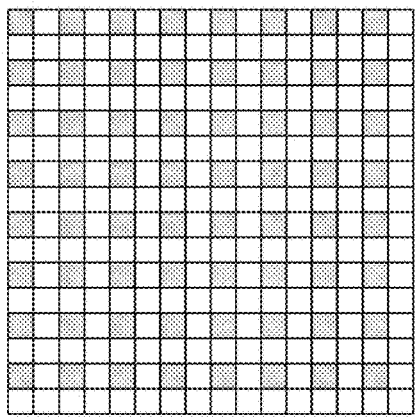
Figure 6D:
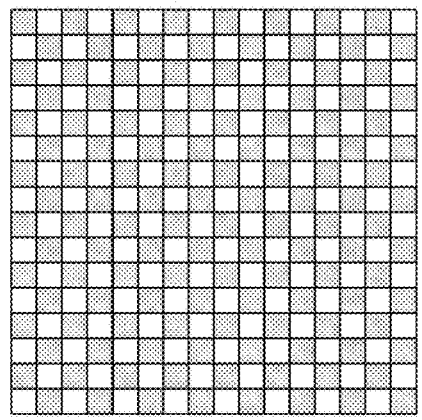
Figure 6E:
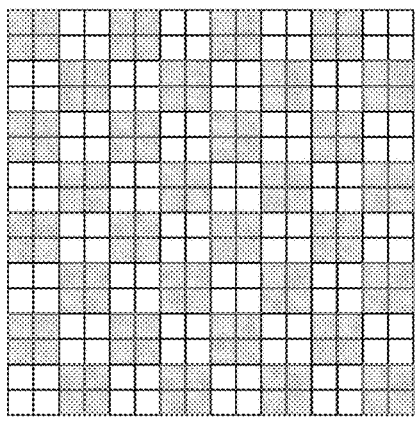
Figure 6F:
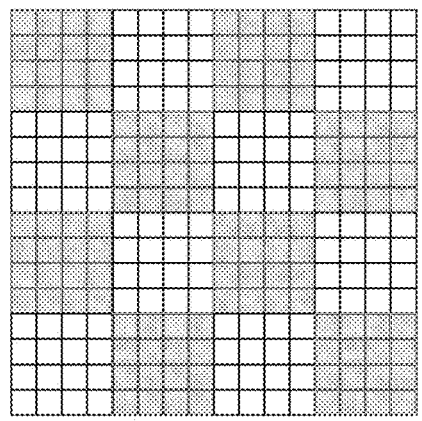

FIG. 5 is a flowchart illustrating the processing of the degree of semitransparency calculation unit 208. For the purpose of description, in the present embodiment, a series of determination processes will be described by using a flowchart including repetitive processing. However, this is not restrictive. A plurality of hardware circuits for performing respective processes may be arranged to make determinations using a plurality of determination patterns in a concurrent, parallel manner (details will be described below).

In step S501, the degree of semitransparency calculation unit 208 initializes variables. The degree of semitransparency calculation unit 208 substitutes 0 into the variables [tmp], [i], and [k]. In step S502, the degree of semitransparency calculation unit 208 compares the corresponding pixels of the binary image and the determination pattern, and determines whether the corresponding pixels match. If the corresponding pixels match (YES in step S502), the processing proceeds to step S503 to add 1 to the degree of similarity [tmp] indicating the degree of matching. If the corresponding pixels do not match (NC) in step S502), the processing proceeds to step S504 without adding 1 to the degree of similarity [tmp].

In step S503, the degree of semitransparency calculation unit 208 adds 1 to the degree of similarity [tmp]. In the present embodiment, the degree of similarity [tmp] is calculated from 7×7 pixels. If all the pixels match, the degree of similarity [tmp] is 49.

A case with the binary image of FIG. 9A and the determination pattern of FIG. 8A will be described. FIG. 8A illustrates a case where the variable [p]=7, the variable [k]=0, and the variable [n]=0. Initially, the degree of semitransparency calculation unit 208 makes a comparison for the variables [i]=0 and [j]=0. The pixel at the variables [i]=0 and [j]=0 in FIG. 8A has a value of 1. The pixel at the variables [i]=0 and [j]=0 in FIG. 9A has a value of 1, which matches that in FIG. 8A. The degree of semitransparency calculation unit 208 then adds 1 to the degree of similarity [tmp]. Next, a case with the binary image of FIG. 9B and the determination pattern of FIG. 8A will be described. The degree of semitransparency calculation unit 208 initially makes a comparison for the variables [i]=0 and [j]=0. The pixel at the variables [i]=0 and [j]=0 in FIG. 8A has a value of 1. The pixel at the variables [i]=0 and [j]=0 in FIG. 9B has a value of 0, which does not match that in FIG. 8A. The degree of semitransparency calculation unit 208 then does not add 1 to the degree of similarity [tmp].

In step S504, the degree of semitransparency calculation unit 208 adds 1 to the variable [i] to compare the next pixel. In step S505, the degree of semitransparency calculation unit 208 determines whether all the pixels arranged in a main scanning direction at a sub scanning position of the 7×7 pixels have been compared. In the present embodiment, since the window size is 7×7 pixels, all the pixels in the main scanning direction can be determined to have been compared if the variable [i]=7. If all the pixels in the main scanning direction are determined to have been compared (YES in step S505), the processing proceeds to step S506 to substitute 0 into the variable [i].

In step S506, the degree of semitransparency calculation unit 208 substitutes 0 into the variable [i]. In step S507, the degree of semitransparency calculation unit 208 adds 1 to the variable [j] to move the pixel of interest in a sub scanning direction. In step S508, the degree of semitransparency calculation unit 208 determines whether all the 7×7 pixels have been compared. In the present embodiment, since the window size is 7×7 pixels, all the pixels are determined to have been compared if the variable [j]=7. If all the pixels are determined to have been compared (YES in step S508), the processing proceeds to step S509 to substitute 0 into the variables [j] and [i] for variable initialization.

A case with the binary image of FIG. 9A and the determination pattern of FIG. 8A will be described. Since all the 7×7 pixels in FIG. 8A match those in FIG. 9A, the degree of similarity [tmp] is 49. In the case with the binary image of FIG. 9B and the determination pattern of FIG. 8A, comparisons between the pixels according to the flowchart reveals some of the pixels matching. Specifically, 31 out of the 49 pixels match, and the degree of similarity [tmp] is 31.

As described above, the degree of similarity [tmp] with FIG. 9A is 49. The degree of similarity [tmp] with FIG. 9B is 24. The degree of similarity [tmp] with FIG. 9C is 31. The binary image of FIG. 9A simulating a semitransparent image thus has the degree of similarity [tmp] of 49 (maximum value), the binary image of FIG. 9C including a semitransparent image in part has the degree of similarity [tmp] of 31, and the binary image of FIG. 9B simulating a character or line the lowest degree of similarity [tmp] of 24. The degree of similarity indicating the degree of semitransparency can thus be quantified by performing pattern matching between the determination patterns that are teaching patterns and the window including the pixel of interest.

In step S509, the degree of semitransparency calculation unit 208 substitutes 0 into the variables [j] and [i] for variable initialization.

In step S510, the degree of semitransparency calculation unit 208 compares the degree of similarity [tmp] with the degree of similarity [SCORE]. If the degree of similarity [tmp] is greater than the degree of similarity [SCORE] (YES in step S510), the processing proceeds to step S511 to substitute the degree of similarity [tmp] into the degree of similarity [SCORE]. The degree of similarity [SCORE] is updated by the substitution of the degree of similarity [tmp]. The highest of the degrees of matching with the compared determination patterns is thus used as the degree of similarity [SCORE].

In step S511, the degree of semitransparency calculation unit 208 substitutes the degree of similarity [tmp] into the degree of similarity [SCORE]. In step S512, the degree of semitransparency calculation unit 208 adds 1 to the variable [k] to perform a comparison with the next determination pattern. The processing proceeds to step S513.

In step S513, the degree of semitransparency calculation unit 208 determines whether the degree of similarity [tmp] has been calculated with all the determination patterns rotated and/or reversed. If the variable [k]=8, the degree of semitransparency calculation unit 208 determines that the degree of similarity [tmp] has been calculated with all the determination patterns rotated and/or reversed (YES in step S513). The processing then proceeds to step S514. If the degree of semitransparency calculation unit 208 determines that there remains an uncalculated determination pattern (NO in step S513), the processing proceeds to step S502.

In step S514, the degree of semitransparency calculation unit 208 substitutes 0 into the variable [k] for initialization. In step S515, the degree of semitransparency calculation unit 208 adds 1 to the variable [p] to calculate the degree of similarity [tmp] with the next determination pattern. In step S516, the degree of semitransparency calculation unit 208 determines whether the degree of similarity [tmp] with the determination patterns of FIGS. 7A to 7H has been calculated. If the variable [p]=23, the degree of semitransparency calculation unit 208 determines that the degree of similarity [tmp] with the determination patterns of FIGS. 7A to 7H has been calculated (YES in step S516). The processing then proceeds to step S517.

In step S517, the degree of semitransparency calculation unit 208 substitutes 0 into the variable [p] for initialization. In step S518, the degree of semitransparency calculation unit 208 adds 1 to the variable [n] to calculate the degree of similarity [tmp] between the determination patterns [pat] obtained by logically inverting the determination patterns of FIGS. 7A to 7H and the binary image [bi].

In step S519, the degree of semitransparency calculation unit 208 determines whether the degree of similarity [tmp] has been calculated with both the determination patterns of FIGS. 7A to 7H and the logically-inverted determination patterns of FIGS. 7A to 7H. If n=2, the degree of semitransparency calculation unit 208 determines that the degree of similarity [tmp] has been calculated with both the determination patterns of FIGS. 7A to 7H and the logically-inverted determination patterns of FIGS. 7A to 7H (YES in step S519). The degree of semitransparency calculation unit 208 outputs the degree of similarity [SCORE] at that point in time as the degree of semitransparency of the binary image [bi]. If the variable [n]=1 (NO in step S519), the processing proceeds to step S502.

The foregoing processing is applied to all the pixels of the binary image [bi] by shifting the pixel of interest one by one, whereby a degree of semitransparency image is generated.

<Description of Method for Parallel Processing>

Figure 19:
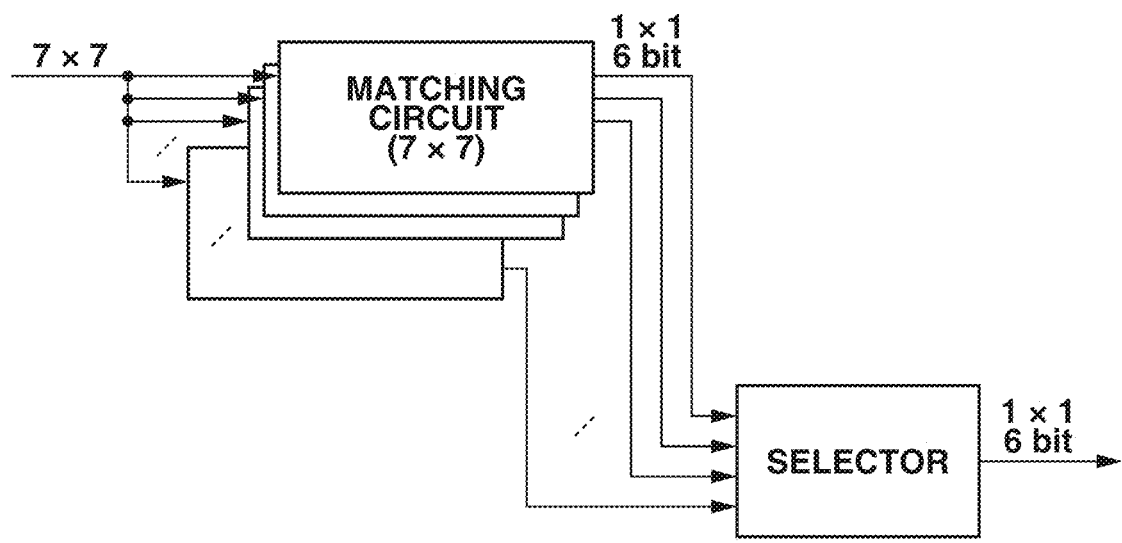
FIG. 19 is a schematic diagram illustrating an example of a circuit configuration for performing the processing for deriving the degree of similarity.

Next, a method for making determinations using a plurality of determination patterns in parallel will be described with reference to FIG. 19. FIG. 19 is a schematic diagram illustrating an example of a circuit configuration for parallel determinations.

A matching circuit is a hardware circuit that reads a determination pattern from a not-illustrated nonvolatile memory, compares the determination pattern with a 7×7-pixel window including a pixel of interest, i.e., input data, pixel by pixel, and outputs the count of matching pixels. There is provided a plurality of such matching circuits, and the matching circuits are assigned respective different determination patterns. The same input data is supplied to the matching circuits, whereby the degrees of similarity [tmp] with all the determination patterns can be derived. The degrees of similarity [tmp] derived by the matching circuits are input to a selector. The selector is configured to output the highest of the input plurality of degrees of similarity. The time needed to derive the degrees of similarity can be reduced by using such a hardware configuration.

<Operation of Image Combining Unit 209>

Figure 10:
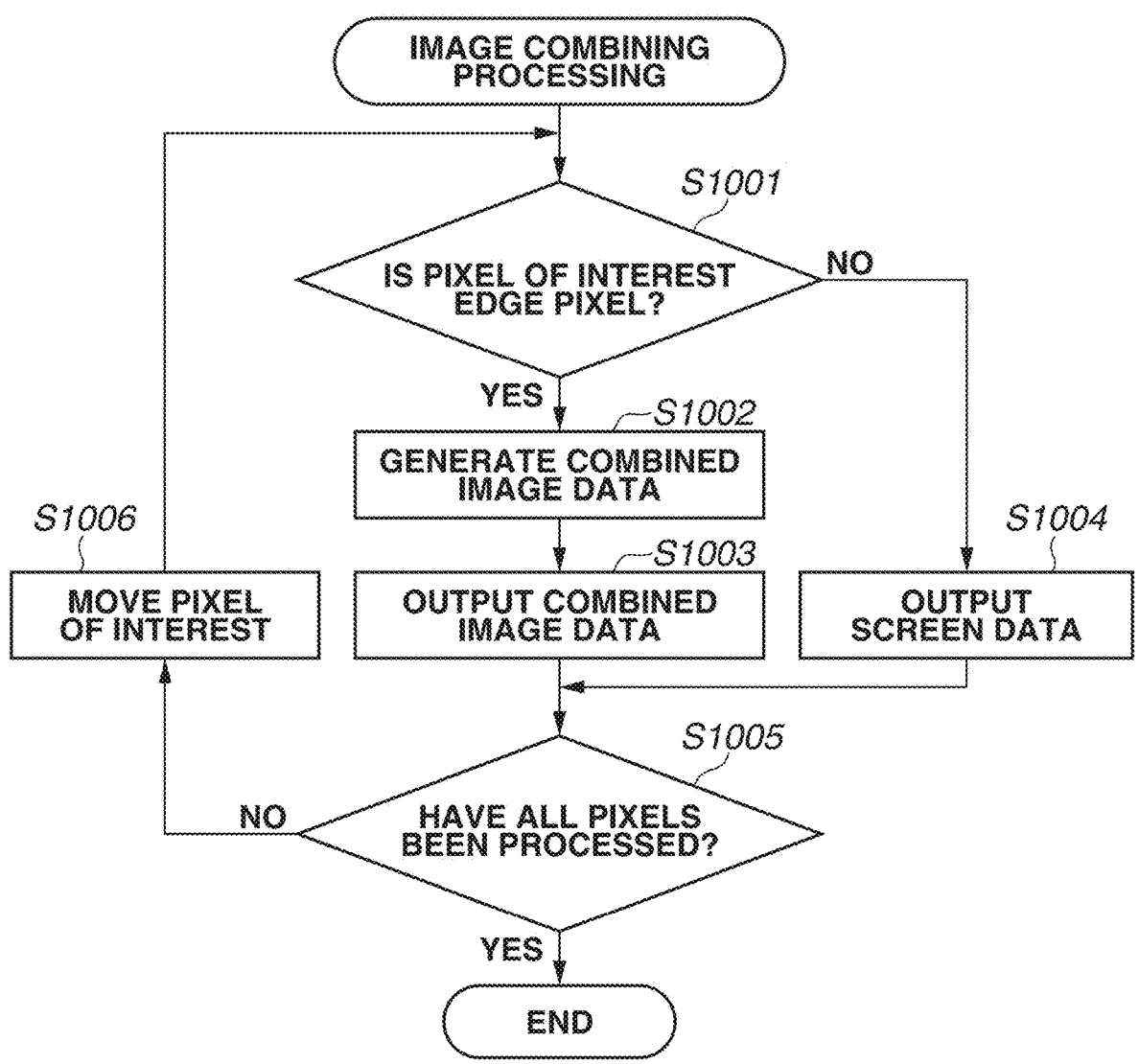
FIG. 10 is a flowchart illustrating an example of image combining processing.

Next, the image combining processing for implementing edge correction will be described with reference to FIG. 10. FIG. 10 is a flowchart of the image combining processing performed by the image combining unit 209.

In step S1001, the image combining unit 209 determines whether a pixel of interest is an edge pixel based on the edge determination image input from the edge determination unit 206. If the edge determination image is "1", the image combining unit 209 determines that the pixel of interest is an edge pixel (YES in step S1001), and the processing proceeds to step S1002. If the edge determination image is "0" (NO in step S1001), the processing proceeds to step S1004 to output screen data input from the screen processing unit 203.

In step S1002, the image combining unit 209 combines screen data ScrData from the screen processing unit 203 and edge correction data EdgeData from the edge correction data generation unit 204 based on the degree of semitransparency of the pixel of interest. Specifically, the image combining unit 209 generates combined image data CombData by using the following equation:

$$CombData = EdgeData \times \alpha + ScrData \times \beta. \quad \text{Eq. (2)}$$

The algorithm for generating the combined image data CombData is not limited thereto. Any algorithm may be used as long as the combining ratio of the edge correction data EdgeData and the screen data ScrData is changed based on the degree of similarity [SCORE].

In step S1003, the image combining unit 209 outputs the combined image data CombData generated in step S1002, in step S1004, the image combining unit 209 outputs the screen data.

In step S1005, the image combining unit 209 determines whether the image combining processing has been performed on all the pixels. If the image combining processing has been performed on all the pixels (YES in step S1005), the processing ends. If the image combining processing is determined to not have been performed on all the pixels (NO in step S1005), the processing proceeds to step S1006.

In step S1006, the image combining unit 209 moves the pixel of interest to the next pixel. The processing proceeds to step S1001, and the image combining unit 209 performs the image combining processing.

<Effect of Edge Correction Processing According to Present Embodiment>

Next, the processing result according to the present embodiment and an effect thereof will be described with reference to FIGS. 12A to 12C and 13A to 13I.

Figure 12A:
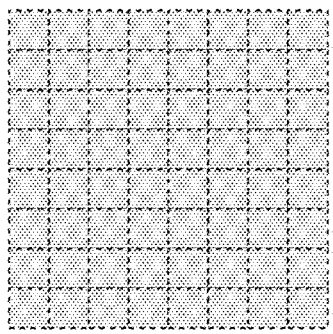
FIGS. 12A to 12C are diagrams illustrating an output image.
Figure 12B:
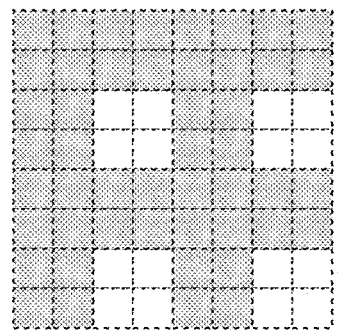
Figure 12C:
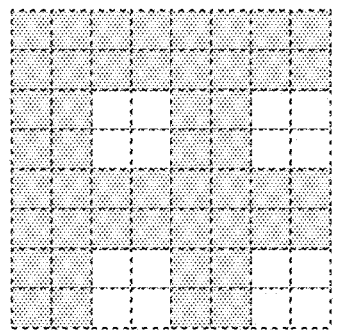

FIGS. 12A to 12C are diagrams illustrating a case where an object having a transparency of 25% is drawn on a white background image by using a raster operation (ROP) command. FIG. 12A illustrates an 8×8-pixel object having a signal value of 128. FIG. 12B illustrates a halftone image used for a transparency of 25%. FIG. 12C illustrates an image obtained by drawing the object of FIG. 12A with a transparency of 25% by using a ROP command. The image processing unit 105 performs the processing for generating the image of FIG. 12C based on PDL data including the ROP command, received from the host I/F unit 101.

Figure 13A:
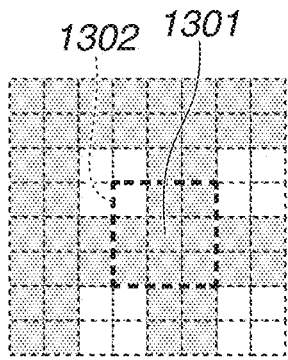
FIGS. 13A to 13I are diagrams illustrating output images.

FIG. 13A illustrates an output image of the color conversion processing unit 201. FIG. 13A illustrates an image obtained by drawing the semitransparent object of FIG. 12A with a transparency of 25% by using a ROP command.

Figure 13B:
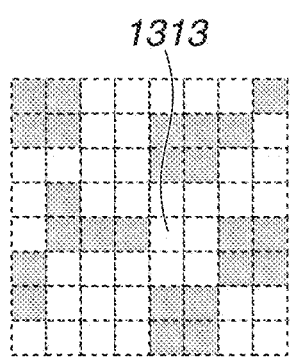
Figure 13C:
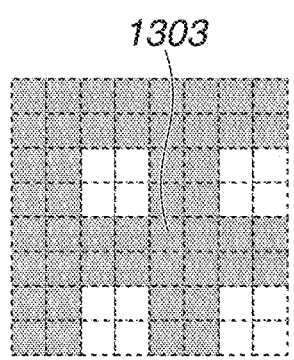

FIG. 13B illustrates an output image of the screen processing unit 203. Each pixel value of FIG. 13A is compared with a threshold of the screen matrix determined by the position in the image. If the pixel value is greater, 15 (4 bits) is output. If the pixel value is less than or equal to the threshold, 0 is output. FIG. 13C illustrates an output image of the edge correction data generation unit 204. The edge correction data generation unit 204 refers to the one-dimensional lookup table of FIG. 3 intended for generation of edge correction data by using each pixel value of FIG. 13A as an argument, and generates the image of FIG. 13C. Since a pixel of interest 1301 has a signal value of 128, edge correction data on a pixel 1303 is 12.

Figure 13D:
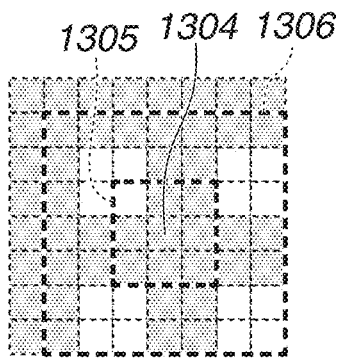

FIG. 13D illustrates an output image of the determination image generation unit 205. Suppose that the pixel of interest 1301 has a signal value of K: 128. The output of a pixel 1304 in the determination image calculated by the foregoing Eq. (1) is thus "L=(C×0.3)+(M×0.6)+(Y×0.1)+(K×1)=128".

Figure 13E:
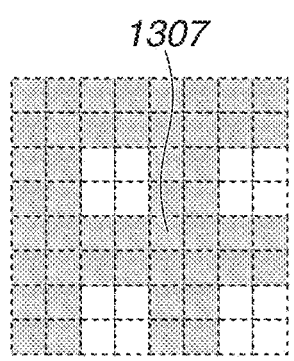

FIG. 13E illustrates an output image of the edge determination unit 206. In the present embodiment, the edge determination value [Sub] is 32. The maximum value of 3×3 pixels 1305 with the pixel 1304 at the center is thus 128. The minimum value of the 3×3 pixels 1305 with the pixel 1304 at the center is 0. The contrast value is the maximum value−the minimum value=128−0=128. Since the contrast value is greater than the edge determination value [Sub], an edge pixel 1307 is "1" (edge).

Figure 13F:
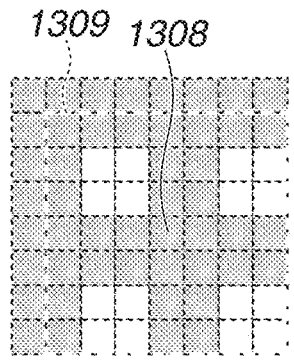

FIG. 13F illustrates an output image of the binarization unit 207. In the present embodiment, the threshold of the binarization unit 207 is 63. Since the pixel 1304 of the determination image has a value of 128 which is greater than the threshold of 63, "1" is output (pixel 1308).

Figure 13G:
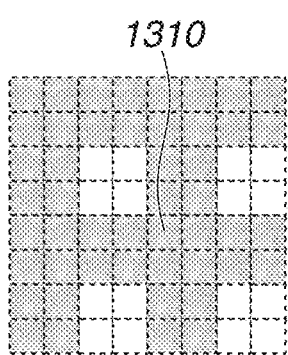

FIG. 13G illustrates an output image of the degree of semitransparency calculation unit 208. A description will be given by using the pixel of interest 1301 as an example. The degree of semitransparency of the pixel of interest 1301 is calculated from 7×7 pixels 1306. A 7×7-pixel binary image 1309 is the binary image of the 7×7 pixels 1306. The logical inversion of the determination pattern of FIG. 8A matches all the 7×7 pixels. A degree of semitransparency 1310, or the degree of similarity [SCORE] of the pixel of interest 1301, is thus 49.

Figure 13H:
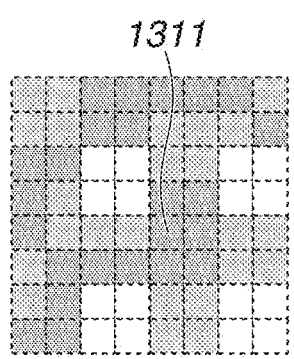

FIG. 13H illustrates an image obtained without suppression of the edge correction processing (without making a determination whether the pixel of interest is a pixel constituting a semitransparent object). If the edge correction processing is not suppressed, the greater of the values of the output image of the screen processing unit 203 illustrated in FIG. 13B and the output image of the edge correction data generation unit 204 illustrated in FIG. 13C is output for a pixel determined to be an edge pixel. A pixel 1311 is an edge pixel since the pixel 1307 is "1". For the pixel 1311, the greater of the values of a pixel 1313 and the pixel 1303 is output. Since the pixel 1313 has a value of 0 and the pixel 1303 has a value of 12, the value of the pixel 1311 is 12. FIG. 13H illustrates a result obtained by similarly processing the other pixels as well. A comparison between FIG. 13H illustrating the output image after the edge correction processing and FIG. 13B prior to the edge correction processing shows an increase in density.

Figure 11:
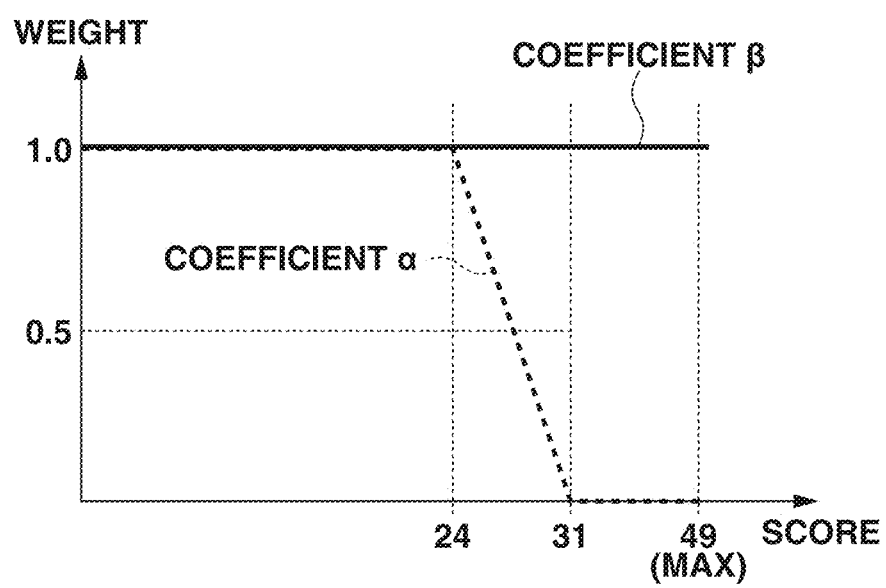
FIG. 11 is a chart illustrating examples of coefficients related to edge correction.
Figure 13I:
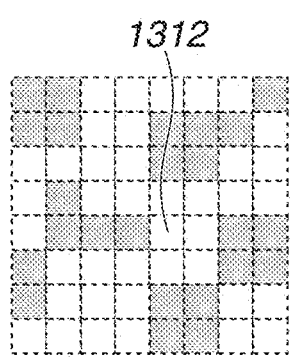

FIG. 13I illustrates an output image of the image combining unit 209 according to the present embodiment. A description will be given by using the pixel of interest 1301 as an example. FIG. 11 is a schematic diagram illustrating examples of coefficients $\alpha$ and $\beta$. The coefficient $\alpha$ is a coefficient that decreases monotonically if the degree of similarity [SCORE] exceeds a first threshold (for example, 24), and becomes 0 if the degree of similarity [SCORE] exceeds a second threshold (for example, 31). In other words, the coefficient $\alpha$ is a coefficient that reduces the intensity of edge correction as the degree of similarity [SCORE] with the determination patterns indicating semitransparency increases. The coefficient $\beta$ may be 1, for example. Coefficients $\alpha$ corresponding to the degrees of similarity [SCORE] are stored in a lookup table. The image combining unit 209 obtains the coefficient $\alpha$ by referring to the lookup table with the degree of similarity [SCORE] as a key.

For example, the degree of semitransparency 1310 of the pixel of interest 1301 is 49, and thus the coefficient $\alpha=0$ and the coefficient $\beta=1.0$. From Eq. (2), "CombData=EdgeData×$\alpha$+ScrData×$\beta$=12×0+0×1.0=0". A pixel 1312 after the image combining processing thus has a value of 0. FIG. 13I illustrates a result obtained by similarly processing the other pixels as well. As illustrated in FIG. 13I, the degree of influence of the edge correction data on pixels determined to be those of a semitransparent pattern is reduced based on Eq. (2). This can suppress an increase in the density of the semitransparent pattern even when the edge correction processing is performed.

Figure 14A:
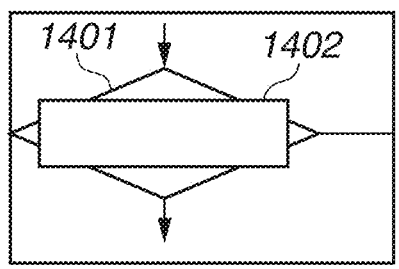
FIGS. 14A to 14D are diagrams illustrating output images.
Figure 14B:
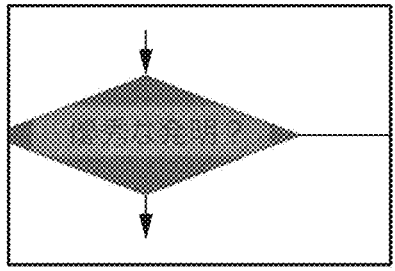
Figure 14C:
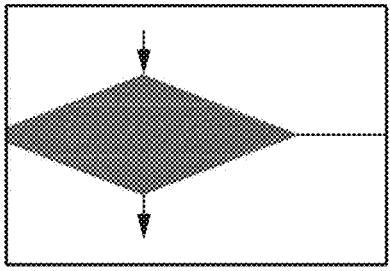
Figure 14D:
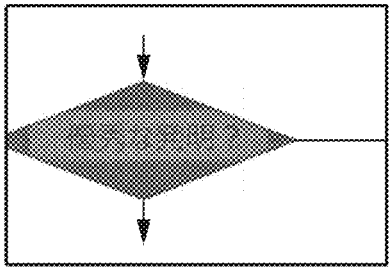

FIGS. 14A to 14D are diagrams for describing an effect of the present embodiment. FIG. 14A illustrates an image including a semitransparent object. An object 1401 in FIG. 14A is a rhombic object having a signal value of 192. An object 1402 in FIG. 14A is a rectangular object having a signal value of 0 and a transparency of 75%. FIG. 14B illustrates an image obtained by reading by a scanner a print product that is printed by the image forming apparatus 2 with no edge correction processing applied to the image of FIG. 14A. FIG. 14C illustrates an image obtained by reading by the scanner a print product that is printed by the image forming apparatus 2 with conventional edge correction processing applied to the image of FIG. 14A. FIG. 14D illustrates an image obtained by reading by the scanner a print product that is printed by the image forming apparatus 2 with the edge correction processing according to the present embodiment applied to the image of FIG. 14A.

From FIG. 14C, it can be seen that the density of the object 1402 is increased by the edge correction processing. In FIG. 14D, unlike FIG. 14C, it is shown that an increase in density is successfully suppressed by determining the semitransparent object.

As described above, by using the method according to the present embodiment in which the degree of semi transparency is calculated and screen data and edge correction data are combined based on the degree of semitransparency, appropriate edge correction processing can be applied even to an image including a semitransparent object.

<Description of Differences from Related Art>

Next, an example of processing according to the present embodiment and details of the processing result will be described with reference to FIGS. 15A to 15I.

Figure 15A:
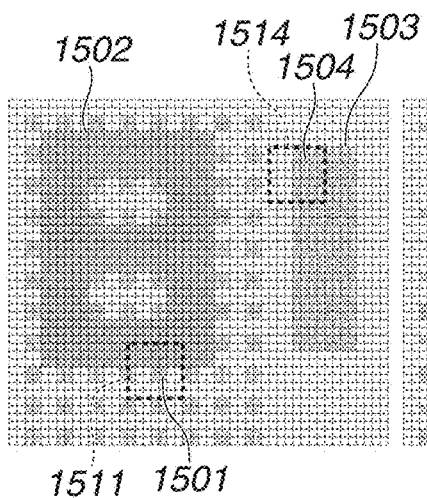
FIGS. 15A to 15I are diagrams illustrating output images.

FIG. 15A illustrates an output image of the color conversion processing unit 201. In the left half of the image of FIG. 15A, a two-box matrix 1502 (representing a Chinese character) having a K-version signal value of 255 is arranged on a semitransparent pixel 1501 having a transparency of 75% and a K-version signal value of 128. The right half of the image of FIG. 15A includes a vertical bar 1503 having a width of 8 pixels, a height of 26 pixels, and a K-version signal value of 128. In the present example, for simplification, C-, M-, and Y-version signal values are assumed to be 0.

Figure 15B:
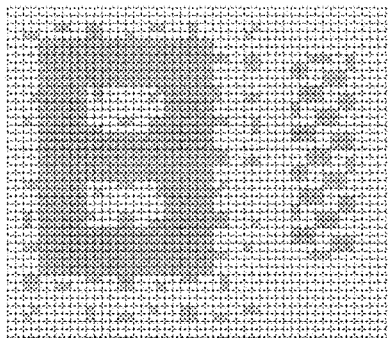

FIG. 15B illustrates an output image of the screen processing unit 203. Each pixel value in FIG. 15A is compared with a screen matrix threshold determined by the position on the image. If the pixel value is greater, 15 (4 bits) is output. If the pixel value is less than or equal to the threshold, 0 is output.

Figure 15C:
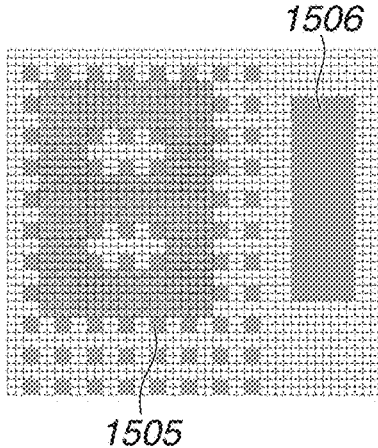

FIG. 15C illustrates an output image of the edge correction data generation unit 204. The edge correction data generation unit 204 generates the output image of FIG. 15C by referring to the one-dimensional lookup table of FIG. 3 intended for the generation of edge correction data with each pixel value in FIG. 15A as an argument. Since the semitransparent pixel 1501 has a signal value of 128, edge correction data on a semitransparent pixel 1505 is 12. A pixel 1504 has a signal vale of 128, and edge correction data on a semitransparent pixel 1506 is 12.

Figure 15D:
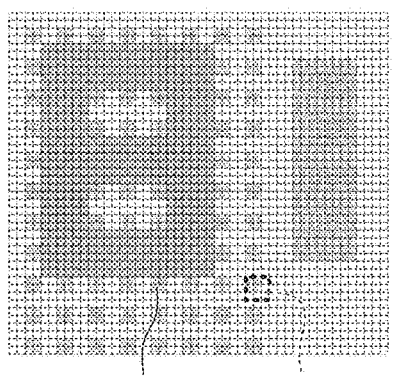

FIG. 15D illustrates an output image of the determination image generation unit 205. The signal value of the semitransparent pixel 1501 is 128. The output of a pixel 1507 of the determination image is calculated by using the foregoing Eq. (1). That is, "L=(C×0.3)+(M×0.6)+(Y×0.1)+(K×1) =128".

Figure 15E:
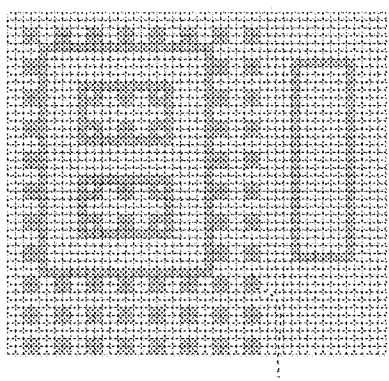

FIG. 15E illustrates an output image of the edge determination unit 206. In the present embodiment, the edge determination value [Sub] is 32. The maximum value of 3×3 pixels 1508 with a semitransparent pixel at the center is then 128. The minimum value of the 3×3 pixels 1508 with the semitransparent pixel at the center is 0. The contrast value is the maximum value−the minimum value=128−0=128. Since the contrast value is greater than the edge determination value [Sub], an edge pixel 1509 is "1" (edge).

Figure 15F:
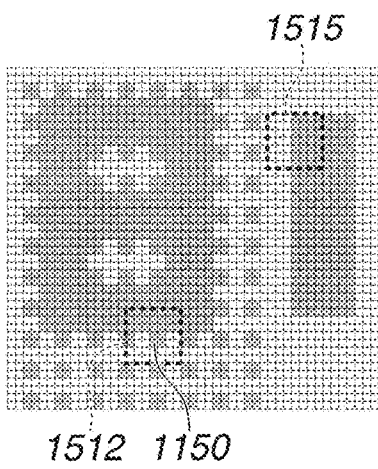

FIG. 15F illustrates an output image of the binarization unit 207. In the present embodiment, the threshold of the binarization unit 207 is 63. Since the pixel 1507 of the determination image has a signal value of 128 which is greater than the threshold of 63, "1" is output (pixel 1510).

Figure 15G:
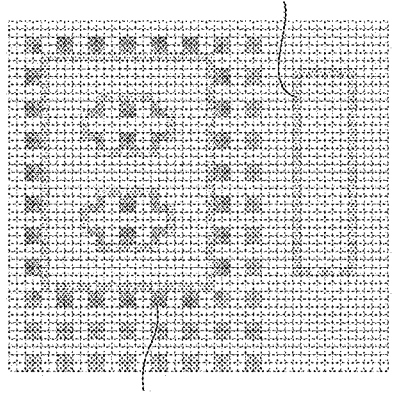

FIG. 15G illustrates an output image of the degree of semitransparency calculation unit 208. A description will be given by using the pixel of interest (semitransparent pixel) 1501 as an example. The degree of semitransparency of the pixel of interest 1501 is calculated from 7×7 pixels 1511. A 7×7-pixel binary image 1512 is the binary image of the 7×7 pixels 1511. The binary image 1512 matches the binary image of FIG. 9C, and thus the degree of semitransparency 1513 of the pixel of interest 1501 is 31. The degree of semitransparency should originally be determined as the highest of values obtained by comparison with all the determination patterns. However, in the present embodiment, only numerical values of the degree of semitransparency with respect to the determination pattern of FIG. 8A will used for simplification.

A description will be given by using a pixel of interest 1504 as an example. The degree of semitransparency of the pixel of interest 1504 is calculated from 7×7 pixels 1514. A 7×7-pixel binary image 1515 is the binary image of the 7×7 pixels 1514. The binary image 1515 matches the binary image of FIG. 9B, and thus the degree of semitransparency 1516 of the pixel of interest 1504 is 24.

Figure 15H:
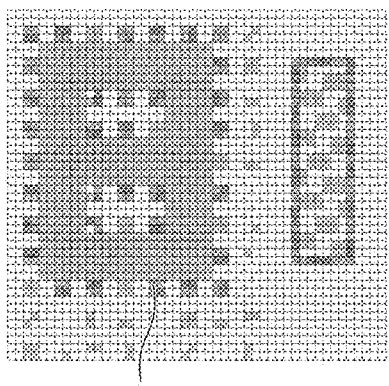

FIG. 15H illustrates an image obtained by suppressing the edge correction processing on pixels matching a semitransparent pattern and applying the edge correction processing to not-matching pixels as in the conventional technique without combining the images based on the degree of semitransparency. A description will be given by using the pixel of interest 1501 as an example. The degree of semitransparency 1513 of the pixel of interest 1501 is 31 and not 49, and the pixel of interest 1501 is determined to not match a semitransparent pattern. Since the greater of the edge correction data 1505 and the screen data is output, the value of a pixel 1517 in the combined image is 12 that is the value of the edge correction data 1505.

The semitransparent pattern can thus be disturbed where semitransparent pixels adjoin a character image, and no longer match the semitransparent pattern. As illustrated in FIG. 15H, it can be seen that the edge correction processing is applied to the semitransparent pixels inside and around the two-box matrix, with a significant drop in the legibility of the two-box matrix.

Figure 15I:
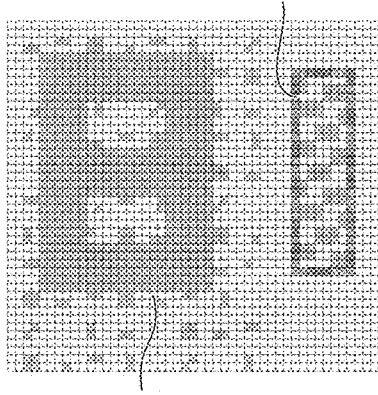

FIG. 15I illustrates an output image of the image combining unit 209. A description will be given by using the pixel of interest 1501 as an example. Since the degree of similarity 1513 of the pixel of interest 1501 is 31, the image combining unit 209 determines from FIG. 11 that the coefficient $\alpha=0$ and the coefficient $\beta=1.0$. From Eq. (2), CombData=EdgeData×$\alpha$+ScrData×$\beta$=11×0+0×1.0=0. A pixel 1518 after the image combining processing thus has a value of 0.

Next, a description will be given by using the pixel of interest 1504 as an example. Since the degree of semitransparency 1516 of the pixel of interest 1504 is 24, the image combining unit 209 determines from FIG. 11 that the coefficient $\alpha=1.0$ and the coefficient $\beta=1.0$. From Eq. (2), CombData=EdgeData×$\alpha$+ScrData×$\beta$=12×1.0+0×1.0=12. A pixel 1519 after the image combining processing thus has a value of 12.

As described above, by using the method according to the present embodiment in which the degree of semitransparency is calculated and the screen data and the edge correction data are combined based on the degree of semitransparency, a high degree of semitransparency can be calculated even at pixels where the semitransparent pattern is disturbed. The edge correction processing can thus be suppressed even at the pixels where the semitransparent pattern is disturbed. The edge correction processing can be appropriately applied to normal edge pixels like the pixel 1504.

Figure 16A:
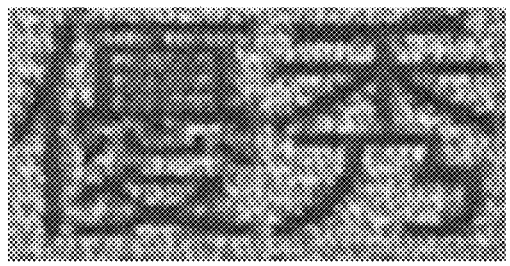
FIGS. 16A and 16B are diagrams illustrating output images.
Figure 16B:
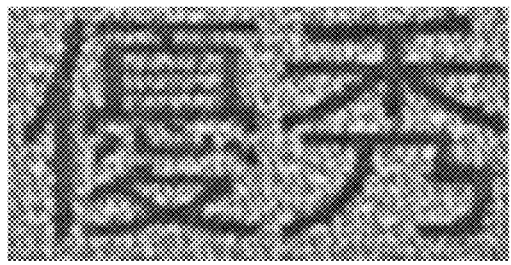

FIGS. 16A and 16B are diagrams illustrating the effect of the present embodiment. FIGS. 16A and 16B are enlarged views of FIGS. 14C and 14D, respectively. FIG. 16A illustrates an image obtained when the edge correction processing on pixels constituting a semitransparent object is suppressed by the technique discussed in Japanese Patent Application Laid-Open No. 2016-58879. FIG. 16B is a diagram illustrating an image obtained when the edge correction processing is applied according to the present embodiment. From FIG. 16A, it can be seen that the application of the edge correction processing to inside the Chinese characters collapses the Chinese characters and lowers the legibility. In FIG. 16B where the present embodiment is applied, the legibility of the Chinese characters is not lowered.

<Effects>

As described above, if the edge correction processing is suppressed on the pixels matching the semitransparent pattern and is applied to the not-matching pixels as in the conventional technique, even a little disturbance in the semitransparent pattern makes the suppression control unavailable and causes an adverse effect. Thickening the semitransparency information is not a solution to this issue. The reason is that all the semitransparent pixels inside one box of the two-box matrix differ from the semitransparent pattern. In other words, in the present example, there is no information to be thickened in the first place.

In the present embodiment, the degrees of similarity indicating the degrees of matching with the determination patterns simulating semitransparent patterns are calculated, and the screen data and the edge correction data are combined based on the degrees of similarity (degree of semitransparency). As illustrated in FIG. 15I, the edge correction processing can thus be applied to normal edge pixels with the edge correction processing suppressed on pixels at which the semitransparent pattern is disturbed.

A second embodiment describes a mechanism for reducing the number of determination patterns by providing the determination patterns with pixels (don't care pixels) at which the degree of semitransparency is incremented regardless of the binary image. The integration of a plurality of determination patterns can reduce circuits needed for storage and cost needed for calculations. The second embodiment includes a hardware configuration similar to that of the first embodiment. A description of similar processing to that of the first embodiment will be omitted as appropriate.

<Description of Determination Patterns>

In the second embodiment, the degree of semitransparency is calculated by using determination patterns illustrated in FIGS. 17A to 17J. FIGS. 17A to 17J are diagrams illustrating examples of the determination patterns. In FIGS. 17A to 17J, "0" represents a pixel for determining whether the corresponding pixel of the binarization unit 207 is "0". In FIGS. 17A to 17J, "1" represents a pixel for determining whether the corresponding pixel of the binarization unit 207 is "1". In FIGS. 17A to 17J, "2" represents a pixel at which the degree of semitransparency is incremented regardless of whether the corresponding pixel of the binarization unit 207 is "0" or "1".

FIGS. 17A and 17B illustrate determination patterns according to the second embodiment. FIGS. 17C to 17F illustrate the determination pattern of FIG. 17A for the variable [k]=0 to 3, respectively. FIGS. 17G to 17J illustrate the determination pattern of FIG. 17B for the variable [k]=0 to 3, respectively. FIG. 17C corresponds to FIG. 17A for the variable [k]=0. FIG. 17D corresponds to FIG. 17A for the variable [k]=1, i.e., FIG. 17A rotated 90° to the right.

FIG. 17E corresponds to FIG. 17A for the variable [k]=2, i.e., FIG. 17A rotated 180° to the right.

FIG. 17F corresponds to FIG. 17A for the variable [k]=3, i.e., FIG. 17A rotated 270° to the right. FIG. 17G corresponds to FIG. 17B for the variable [k]=0.

FIG. 17H corresponds to FIG. 17B for the variable [k]=1, i.e., FIG. 17B rotated 90° to the right. FIG. 17I corresponds to FIG. 17B for the variable [k]=2, i.e., FIG. 17B rotated 180° to the right.

FIG. 17J corresponds to FIG. 17B for the variable [k]=3, i.e., FIG. 17B rotated 270° to the right. FIG. 17A illustrates a determination pattern to substitute for the determination patterns of FIGS. 7A to 7D. With attention focused on FIGS. 7A to 7D, several characteristics can be seen. FIG. 7B illustrates cases where there are two isolated points, including one at the 2×2 pixels in the center and the other at any one of the pixel positions of "2" in FIG. 17A. FIG. 7C illustrates cases where there are three isolated points, including one at the 2×2 pixels in the center and two others at any of the pixel positions of "2" in FIG. 17A. FIG. 7D illustrates a case where there are four isolated points, i.e., a determination pattern in which all the "2"s in FIG. 17A constitute isolated points.

FIG. 7A illustrates a case where there is one isolated point, i.e., a determination pattern in which the "2"s in FIG. 17A constitute no isolated point. From the foregoing description, it can be seen that all the pixels other than the isolated point at the 2×2 pixels including the pixel of interest (corresponding pixels are "1") and the "2"s in FIG. 17A are "0". The degrees of semitransparency in FIGS. 7A to 7D can thus be calculated from the pixels other than the "2"s in FIG. 17A.

Replacing the eight determination patterns of FIGS. 7A to 7D with the single determination pattern of FIG. 17A can reduce the circuits for storing the determination patterns and the circuits for calculating the degrees of semitransparency to one eighth. In the case of making determinations by a software program, the calculation cost of the determination processing can be reduced to one eighth.

FIG. 17B illustrates a determination pattern to substitute for the determination patterns of FIGS. 7E to 7H. With attention focused on FIGS. 7E to 7H, there are found several features. It can be seen that FIGS. 7E to 7H are the same in terms of the pixels other than "2"s in FIG. 17B. FIGS. 7E to 7H differ in whether there is a dot or dots at the pixel positions of "2" in FIG. 17B. The degrees of semitransparency in FIGS. 7E to 7H can be calculated from the pixels other than the "2"s in FIG. 17B.

Replacing the fifteen determination patterns of FIGS. 7E to 7H with the single determination pattern of FIG. 17B can reduce the circuits for storing the determination patterns and the circuits for calculating the degrees of semitransparency to one fifteenth.

<Description of Flowchart>

Figure 18:
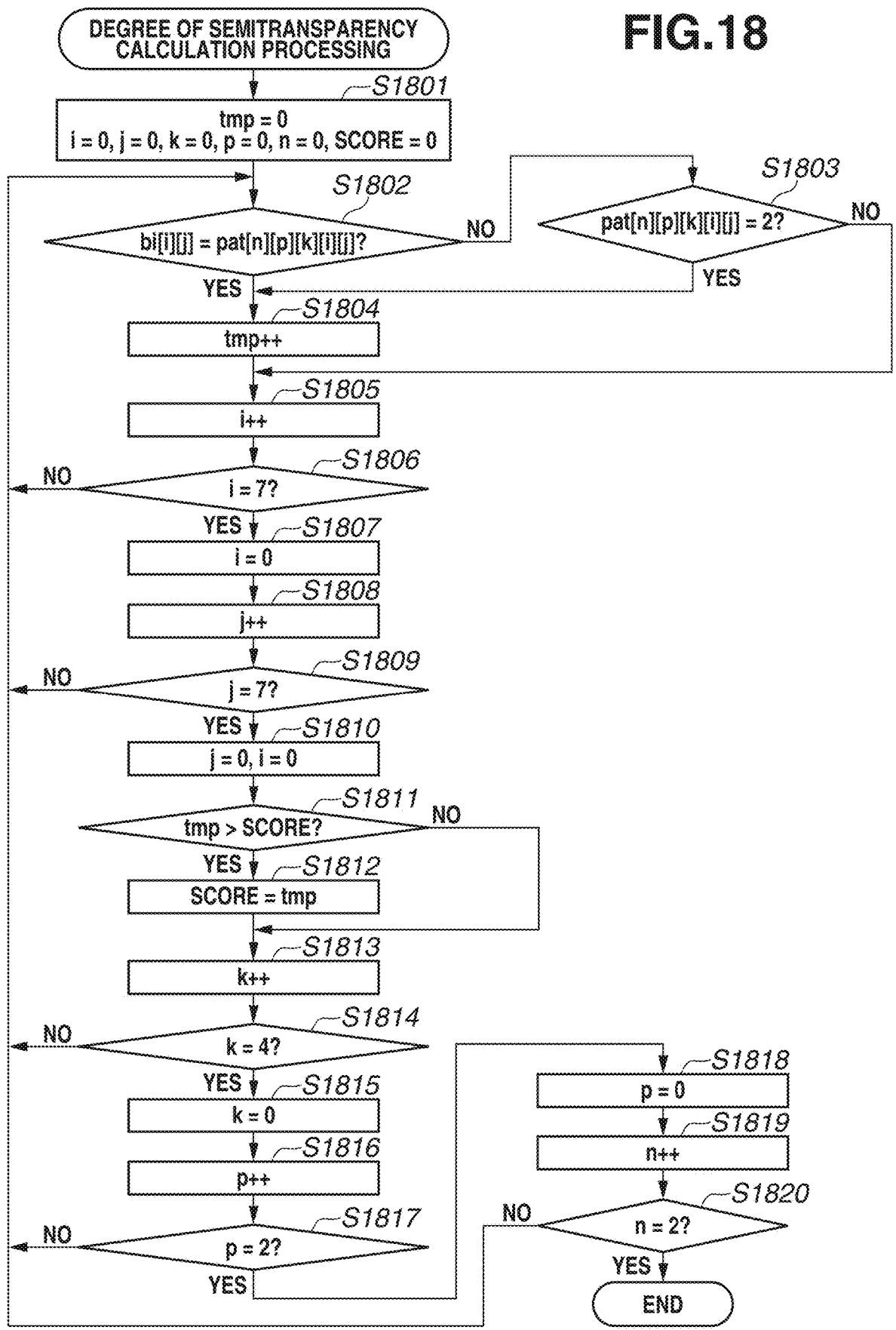
FIG. 18 is a flowchart illustrating an example of a method for deriving the degree of similarity according to the second embodiment.

FIG. 18 is a flowchart illustrating the processing of the degree of semitransparency calculation unit 208.

In step S1801, the degree of semitransparency calculation unit 208 initializes variables. The degree of semitransparency calculation unit 208 substitutes 0 into variables [tmp],

[i], [j], and [k]. In step S1802, the degree of semitransparency calculation unit 208 compares the corresponding pixels of the binary image and the determination pattern, and determines whether the pixels match. If the pixels match (YES in step S1802), the processing proceeds to step S1804 to add 1 to the degree of similarity [tmp]. If the pixels do not match (NO in step S1802), the processing proceeds to step S1803 without adding 1 to the degree of similarity [tmp].

In step S1803, the degree of semitransparency calculation unit 208 determines whether the pixel of interest of the determination pattern is "2". If the pixel of interest of the determination pattern is "2" (YES in step S1803), the processing proceeds to step S1804 to add 1 to the degree of similarity [tmp]. If the pixel of interest of the determination pattern is not "2" (NO in step S1803), the processing proceeds to step S1805 to move the pixel of interest to the next pixel.

In step S1804, the degree of semitransparency calculation unit 208 adds 1 to the degree of similarity [tmp].

A case with the binary image of FIG. 9A and the determination pattern of FIG. 17A will be described. FIG. 17A illustrates a case where the variable [p]=0, the variable [k]=0, and the variable [n]=0. The degree of semitransparency calculation unit 208 initially compares the pixels at the variables [i]=0 and [j]=0. The pixel at the variables [i]=0 and [j]=0 in FIG. 17A is 2. The pixel at the variables [i]=0 and [j]=0 in FIG. 9A has a value of 1. In step S1802, the pixels are therefore determined to not match (NO in step S1802), and the processing proceeds to step S1803. In step S1803, the pixel of interest of the determination pattern is determined to be 2 (YES in step S1803), and the processing proceeds to step S1804. In step S1804, the degree of semitransparency calculation unit 208 adds 1 to the degree of similarity [tmp].

Next, a case with the binary image of FIG. 9B and the determination pattern of FIG. 17A will be described. Initially, the degree of semitransparency calculation unit 208 compares the pixels at the variables [i]=0 and [j]=0. The pixel at the variables [i]=0 and [j]=0 in FIG. 17A is 2. The pixel at the variables [i]=0 and [j]=0 in FIG. 9B has a value of 0. Since the pixels of FIGS. 9B and 17A do not match (NO in step S1802), the processing proceeds to step S1803. In step S1803, the pixel of interest of the determination pattern is determined to be 2 (YES in step S1803), and the processing proceeds to step S1804. In step S1804, the degree of semitransparency calculation unit 208 adds 1 to the degree of similarity [tmp].

In step S1805, the semitransparency calculation unit 208 adds 1 to the variable [i] to compare the next pixels. In step S1806, the degree of semitransparency calculation unit 208 determines whether all the pixels arranged in the main scanning direction at a sub scanning position of the 7×7 pixels have been compared. In the present embodiment, since the window size is 7×7 pixels, all the pixels in the main scanning direction can be determined to have been compared if the variable [i]=7. If all the pixels in the main scanning direction are determined to have been compared (YES in step S1806), the processing proceeds to step S1807 to substitute 0 into the variable [i].

In step S1807, the degree of semitransparency calculation unit 208 substitutes 0 into the variable [i]. In step S1808, the degree of semitransparency calculation unit 208 adds 1 to the variable [j] to move the pixel of interest in the sub scanning direction.

In step S1809, the degree of semitransparency calculation unit 208 determines whether all the 7×7 pixels have been compared. In the present embodiment, since the window size is 7×7 pixels, the degree of semitransparency calculation unit 208 can determine that all the pixels have been compared if the variable [j] is 7. If all the pixels are determined to have been compared (YES in step S1809), the processing proceeds to step S1810 to substitute 0 into the variables [j] and [i] for variable initialization.

A case with the binary image of FIG. 9A and the determination pattern of FIG. 17A will be described. If the pixels of FIGS. 17A and 9A are compared according to the flowchart, all the pixels other than those at the pixel positions of "2" in FIG. 17A match. Since the pixel positions of "2" in FIG. 17A are taken into account in the addition of the degree of matching, the degree of similarity [tmp] is 49.

Next, a case with the binary image of FIG. 9B and the determination pattern of FIG. 17A will be described. If the pixels are compared according to the flowchart, 22 out of the 49 pixels match. Since 22+5 (the number of pixels of "2" in FIG. 17A)=27, the degree of similarity [tmp] is 27.

A case with the binary image of FIG. 9C and the determination pattern of FIG. 17A will be described. If the pixels are compared according to the flowchart, a match occurs in the following cases; where the variable [i]=1 to 6 and the variable [i]=3; where the variable [i]=1 to 6 and the variable [j]=4; where the variable [j]=5; and where the variable [j]6. In other words, 26 pixels match. Since 26+5 (the number of pixels of "2" in FIG. 17A)=31, the degree of similarity [tmp] is 31.

As described above, the degree of similarity [tmp] with FIG. 9A is 49, the degree of similarity [tmp] with FIG. 9B is 27, and the degree of similarity [tmp] with FIG. 9C is 31. The binary image of FIG. 9A simulating a semitransparent image has the degree of similarity [tmp] of 49 (maximum value), the binary image of FIG. 9C including a semitransparent image in part has the degree of similarity [tmp] of 31, and the binary image of FIG. 9B simulating a character or line has the lowest degree of similarity [tmp] of 27. This shows that the degrees of semitransparency are successfully quantified.

In step S1810, the degree of semitransparency calculation unit 208 substitutes 0 into the variables [j] and [i] for variable initialization. In step S1811, the degree of semitransparency calculation unit 208 compares the degree of similarity [tmp] and the degree of similarity [SCORE]. If the degree of similarity [tmp] is higher than the degree of similarity [SCORE] (YES in step S1811), the processing proceeds to step S1812 to substitute the degree of similarity [tmp] into the degree of similarity [SCORE]. The degree of similarity [SCORE] is updated by the substitution of the degree of similarity [tmp]. The highest of the degrees of matching with the compared determination patterns is thus employed as the degree of similarity [SCORE].

In step S1812, the degree of semitransparency calculation unit 208 substitutes the degree of similarity [tmp] into the degree of similarity [SCORE].

In step S1813, the degree of semitransparency calculation unit 208 adds 1 to the variable [k] to perform a comparison with the next determination pattern. The processing proceeds to step S1814.

In step S1814, the degree of semitransparency calculation unit 208 determines whether the degrees of similarity have been calculated for all the determination patterns rotated and/or inverted. If the variable [k] is 4, the degree of semitransparency calculation unit 208 determines that the degrees of similarity have been calculated for all the determination patterns rotated and/or inverted (YES in step S1814). The processing proceeds to step S1815. If the degree of semitransparency calculation unit 208 determines that there remains an uncalculated determination pattern (NO in step S1814), the processing proceeds to step S1802.

In step S1815, the degree of semitransparency calculation unit 208 substitutes 0 into the variable [k] for initialization. In step S1816, the degree of semitransparency calculation unit 208 adds 1 to the variable [p] to calculate the degrees of similarity with the next determination pattern.

In step S1817, the degree of semitransparency calculation unit 208 determines whether the degrees of similarity with the determination patterns of FIGS. 17A and 17B have been calculated. If the variable [p] is 2, the degree of semitransparency calculation unit 208 determines that the degrees of similarity with the determination patterns of FIGS. 17A and 17B have been calculated (YES in step S1817). The processing then proceeds to step S1818.

In step S1818, the degree of semitransparency calculation unit 208 substitutes 0 into the variable [p] for initialization. In step S1819, the degree of semitransparency calculation unit 208 adds 1 to the variable [n] to calculate the degrees of similarity between the determination patterns obtained by logically inverting the determination patterns of FIGS. 17A and 17B and the binary image [bi].

In step S1820, the degree of semitransparency calculation unit 208 determines whether the degrees of similarity have been calculated with both the determination patterns of FIGS. 17A and 17B and the logically-inverted determination patterns of FIGS. 17A and 17B. If n is 2, the degree of semitransparency calculation unit 208 determines that the degrees of similarity have been calculated with both the determination patterns of FIGS. 17A and 17B and the logically-inverted determination patterns of FIGS. 17A and 17B (YES in step S1820). The degree of semitransparency calculation unit 208 outputs the degree of similarity [SCORE] at this point in time as the degree of semitransparency of the binary image [bi]. If the variable [n] is 1 (NO in step S1820), the processing proceeds to step S1802.

As described above, a plurality of determination patterns can be integrated by providing the determination patterns with pixels to add the degree of semitransparency regardless of the binary image. As also described in the first embodiment, hardware circuits that output similar results as those of the calculations described in the processing steps of FIG. 18 can be configured to speed up the calculation. As described in FIG. 19, a plurality of matching circuits for outputting the degrees of similarity [tmp] based on the determination patterns and input data (7×7 pixels) and a selector may be used for implementation.

As described above, in the second embodiment, the circuit scale and the calculation cost can be reduced while implementing the edge correction processing at low cost, compared to the first embodiment. Specifically, since the 23 determination patterns can be integrated into two determination patterns, the circuits for storing the determination patterns can be reduced to two twenty-thirds. Circuits needed for calculation can also be reduced.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may include one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to embodiments, it is to be understood that the disclosure is not limited to the disclosed embodiments. The scope of the following claims is to be accorded the broadest interpretation so as to encompass all such modifications and equivalent structures and functions.

This application claims the benefit of Japanese Patent Application No. 2018-136070, filed Jul. 19, 2018, which is hereby incorporated by reference herein in its entirety.

What is claimed is:

1. An image processing apparatus comprising:
a controller including a processor, the controller configured to perform operations including:
comparing a light-dark pattern of a plurality of pixels of an input image with a previously-stored pattern to determine a degree of matching in at least three levels between the light-dark pattern of the plurality of pixels and the previously-stored pattern, wherein the plurality of pixels include a pixel of interest and pixels disposed peripheral to the pixel of interest, and
changing intensity of edge correction processing to be applied to the pixel of interest in the at least three levels based on the determined degree of matching in the at least three levels.

2. The image processing apparatus according to claim 1, wherein the operations further include setting the intensity of the edge correction processing to be the lowest intensity in a case that the determined degree of matching is the lowest in the at least three levels, setting the intensity of the edge correction processing to be the highest intensity in a case that the determined degree of matching is the highest in the at least three levels, and setting the intensity of the edge correction processing to be in a middle between the lowest and highest intensities in a case that the determined degree of matching is in the middle between the lowest and highest degrees of matching.

3. The image processing apparatus according to claim 1, wherein the previously-stored pattern includes plural pixels,
wherein, for each pixel of the input image that corresponds to a pixel of the previously-stored pattern, a value of the corresponding pixel of the previously-stored pattern is compared with a value of the corresponding pixel of the input image, and
wherein the previously-stored pattern (i) includes a pixel to increase the degree of matching in a case where the pixel of the input image is darker than a threshold, (ii)

includes a pixel to increase the degree of matching in a case where the pixel of the input image is brighter than the threshold, and (iii) includes a pixel to not change the degree of matching regardless of whether the pixel of the input image is brighter or darker than the threshold.

4. The image processing apparatus according to claim 1, wherein the operations further include:

applying screen processing to the input image to obtain a screen-processed image, and applying the edge correction processing to the pixel of interest in the screen-processed image based on the intensity of edge correction processing.

5. The image processing apparatus according to claim 1, wherein the light-dark pattern is changed based on resolution used in drawing a semitransparent object.

6. A method for an image processing apparatus, the method comprising:

comparing a light-dark pattern of a plurality of pixels of an input image with a previously-stored pattern to determine a degree of matching in at least three levels between the light-dark pattern of the plurality of pixels and the previously-stored pattern, wherein the plurality of pixels include a pixel of interest and pixels disposed peripheral to the pixel of interest; and changing intensity of edge correction processing to be applied to the pixel of interest in the at least three levels based on the determined degree of matching in the at least three levels.

7. A non-transitory storage medium storing a program to cause a computer to perform a method for an image processing apparatus, the method for an image processing apparatus, the method comprising:

comparing a light-dark pattern of a plurality of pixels of an input image with a previously-stored pattern to determine a degree of matching in at least three levels between the light-dark pattern of the plurality of pixels and the previously-stored pattern, wherein the plurality of pixels include a pixel of interest and pixels disposed peripheral to the pixel of interest; and changing intensity of edge correction processing to be applied to the pixel of interest in the at least three levels based on the determined degree of matching in the at least three levels.

* * * * *